United States Patent
Ying et al.

(10) Patent No.: US 9,083,052 B2
(45) Date of Patent: Jul. 14, 2015

(54) NANOCOMPOSITES

(75) Inventors: Jackie Y. Ying, Singapore (SG); Jun Yang, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 287 days.

(21) Appl. No.: 13/522,944

(22) PCT Filed: Mar. 30, 2011

(86) PCT No.: PCT/SG2011/000132
§ 371 (c)(1),
(2), (4) Date: Feb. 15, 2013

(87) PCT Pub. No.: WO2011/123067
PCT Pub. Date: Oct. 6, 2011

(65) Prior Publication Data
US 2013/0189604 A1   Jul. 25, 2013

Related U.S. Application Data

(60) Provisional application No. 61/319,257, filed on Mar. 30, 2010.

(51) Int. Cl.
| | |
|---|---|
| B01J 23/38 | (2006.01) |
| B01J 23/40 | (2006.01) |
| B01J 23/42 | (2006.01) |
| B01J 23/44 | (2006.01) |
| B01J 23/46 | (2006.01) |
| B01J 23/52 | (2006.01) |
| B01J 37/00 | (2006.01) |
| H01M 4/00 | (2006.01) |
| H01M 4/02 | (2006.01) |

(Continued)

(52) U.S. Cl.
CPC ............... *H01M 4/921* (2013.01); *B01J 23/50* (2013.01); *B01J 27/045* (2013.01); *B01J 35/002* (2013.01); *B01J 35/004* (2013.01); *B01J 35/006* (2013.01); *H01M 4/8657* (2013.01); *H01M 4/8842* (2013.01); *H01M 4/926* (2013.01); *H01M 4/96* (2013.01)

(58) Field of Classification Search
USPC ............ 502/347; 428/403, 469; 977/773, 810
See application file for complete search history.

(56) References Cited

U.S. PATENT DOCUMENTS 6,103,868 A * 8/2000 Heath et al. ............... 528/482
8,298,314 B2 * 10/2012 Li ................................. 75/371

(Continued)

FOREIGN PATENT DOCUMENTS

| WO | WO 2008/102351 A2 | 8/2008 |
| WO | WO 2010/016798 A1 | 2/2010 |

OTHER PUBLICATIONS

"Template synthesis of M/M2S (M—Ag, Cu) hetero-nanowires by electrochemical technique," Changhao Liang et al. Solid State Ionics 177 (2006), pp. 2527-2531.*

(Continued)

*Primary Examiner* — Patricia L Hailey
(74) *Attorney, Agent, or Firm* — Blakely, Sokoloff, Taylor & Zafman LLP

(57) ABSTRACT

The invention pertains to heterogenous noble metal nanostructures comprising silver salts and different noble metals, and methods for synthesis and use of various nanocomposite materials having silver salts and different noble metals.

17 Claims, 14 Drawing Sheets

(51) Int. Cl.

| | | |
|---|---|---|
| *H01M 4/90* | (2006.01) | |
| *H01M 4/92* | (2006.01) | |
| *B32B 5/16* | (2006.01) | |
| *B32B 5/22* | (2006.01) | |
| *B32B 15/00* | (2006.01) | |
| *B32B 15/04* | (2006.01) | |
| *B32B 27/02* | (2006.01) | |
| *H01M 4/86* | (2006.01) | |
| *H01M 4/88* | (2006.01) | |
| *H01M 4/96* | (2006.01) | |
| *B01J 23/50* | (2006.01) | |
| *B01J 27/045* | (2006.01) | |
| *B01J 35/00* | (2006.01) | |

(56) References Cited

U.S. PATENT DOCUMENTS 8,632,884 B2 * 1/2014 Ying et al. .................. 428/403
2011/0287259 A1 * 11/2011 Ying et al. .................. 428/402

OTHER PUBLICATIONS

"Silver sulfide nanoparticle assembly obtained by reacting an assembled silver nanoparticle template with hydrogen sulfide gas," Rui Chen et al. Nanotechnology 19 (2008), pp. 1-11.*

"A general phase-transfer protocol for metal ions and its application in nanocrystal synthesis," Jun Yang et al. Nature Materials 2009, vol. 8, pp. 683-689.*

Supplementary Information for "A general phase-transfer protocol for metal ions and its application in nanocrystal synthesis," Jun Yang et al. (Nature Materials 2009, vol. 8, pp. 683-689), pp. 1-25.*

Activity benchmarks and requirements for Pt, Pt-alloy, and non-Pt oxygen reduction catalysts for PEMFCs Applied Catalysis B: Environmental, vol. 56, Issues 1-2, pp. 9-35 (Mar. 10, 2005).

PCT International Search Report for PCT Counterpart Application No. PCT/SG2011/000132 5 pgs (Jun. 10, 2011).

Written Opinion of the International Search Authority for PCT Counterpart Application No. PCT/SG2011/000132, 6 pgs. (Jun. 10, 2011).

PCT Notification of Transmittal of International Preliminary Examination Report for PCT Application No. PCT/SG2011/000132, 7 pgs. (Oct. 2, 2012).

David R. Lide, "Electron Work Function of the Elements", CRC Handbook of Chemistry and Physics, $89^{th}$ Edition, CRC Press—Taylor & Francis Group, Boca Raton, Florida, 17 pp. (including cover page, copyright, table of contents, and relevant pages), (2008).

F. Albert Cotton, et al., "22-H-1: General Remarks; Stereochemistry" and "22-H-6: Compounds with Metal-Metal Bonds—Carbonyl Anion Compounds", Advanced Inorganic Chemistry—A Comprehensive Text, $4^{th}$ Edition, Wiley-Interscience Publication, New York, New York, 18 pp. (including cover page, copyright, table of contents, and relevant pages), (1980).

J. Yang, et al., "A Bis(p-sulfonatophenyl)phenylphosphine-Based Synthesis of Hollow Pt Nanospheres", Journal of Physical Chemistry B, vol. 110, No. 1, pp. 125-129, (2006).

Takako Toda, et al., "Enhancement of the Electroreduction of Oxygen on Pt Alloys with Fe, Ni, and Co", Journal of the Electrochemical Society, vol. 146, No. 10, pp. 3750-3756, (1999).

* cited by examiner

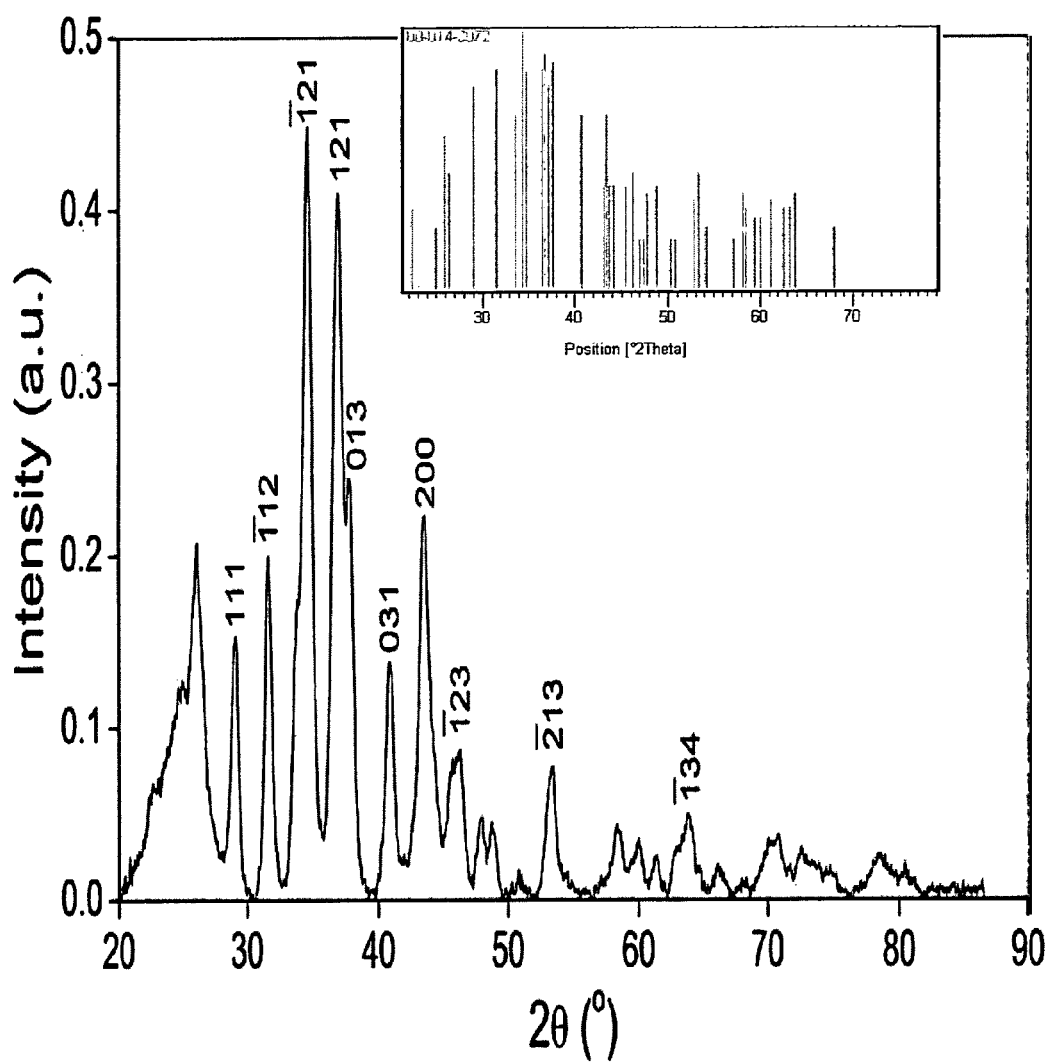
Figure S1

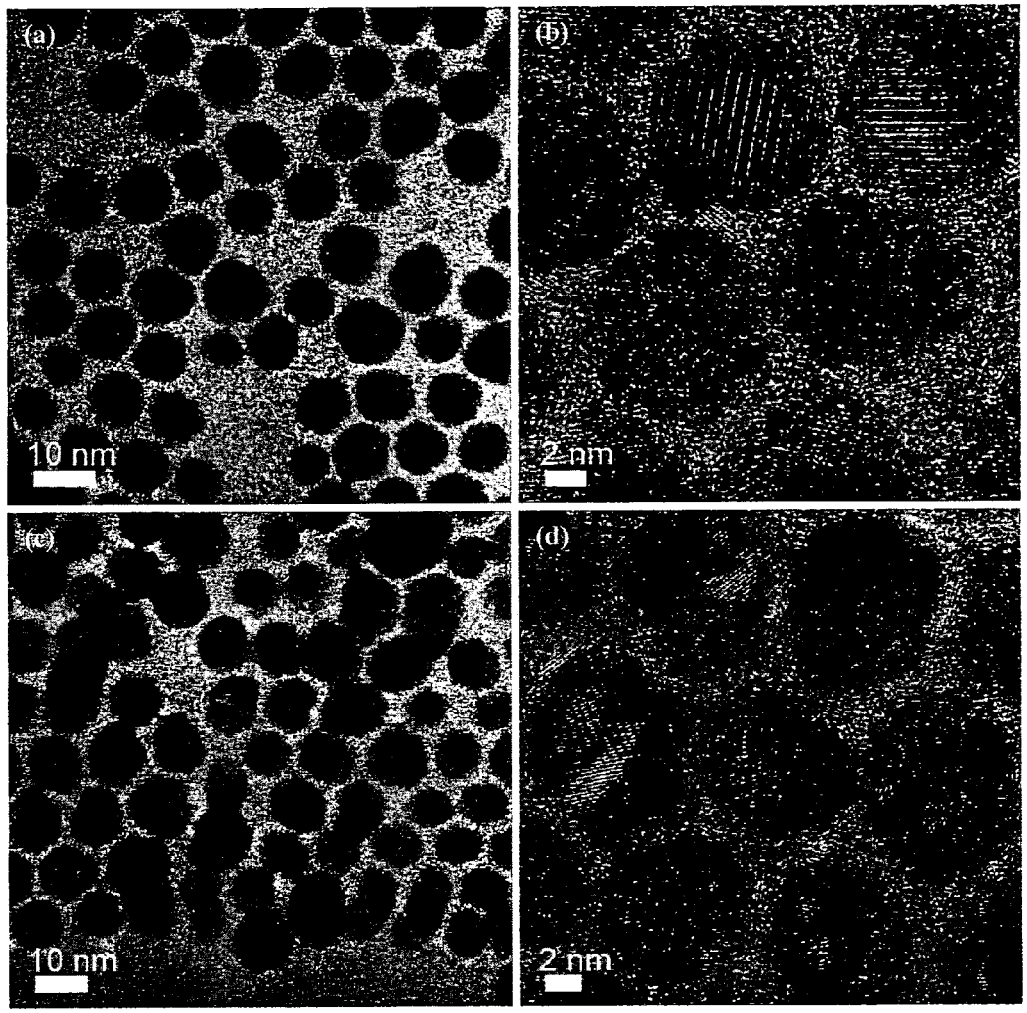
Figure S2

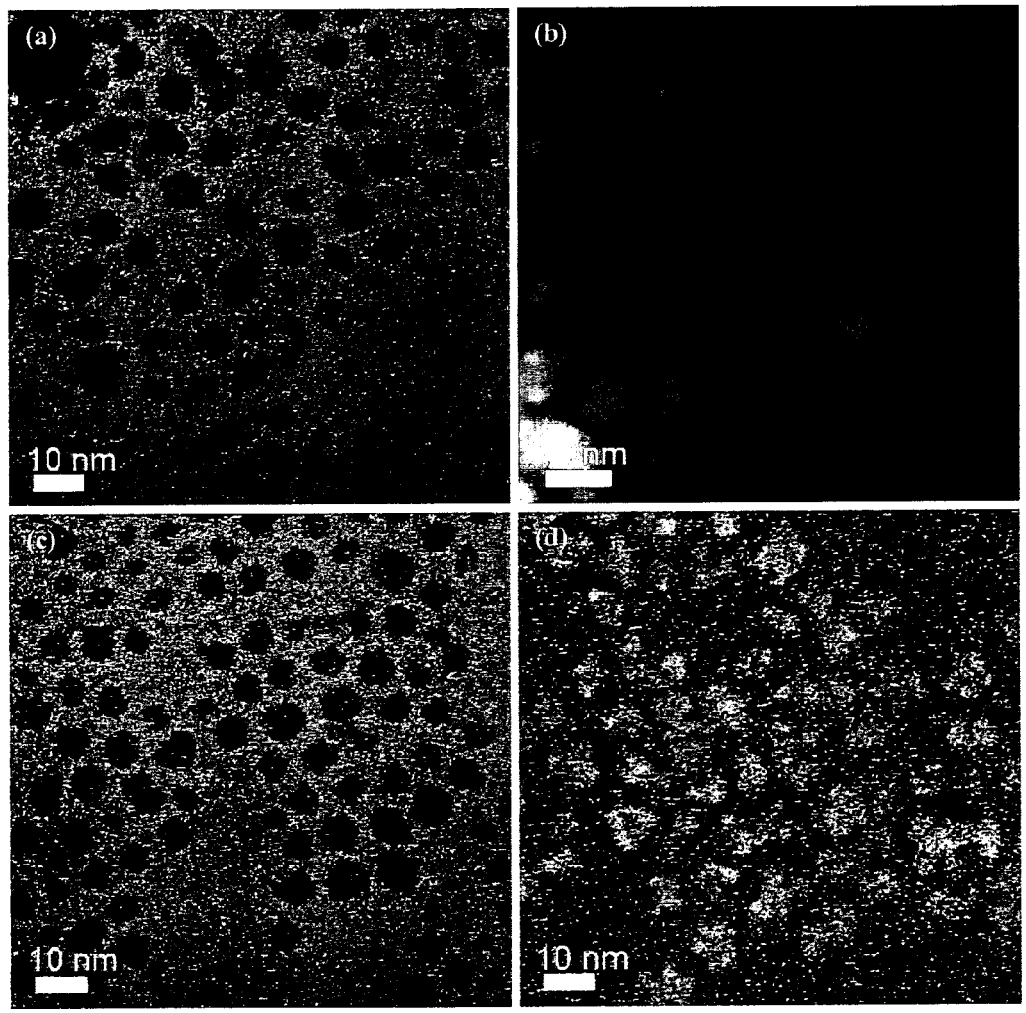
Figure S3

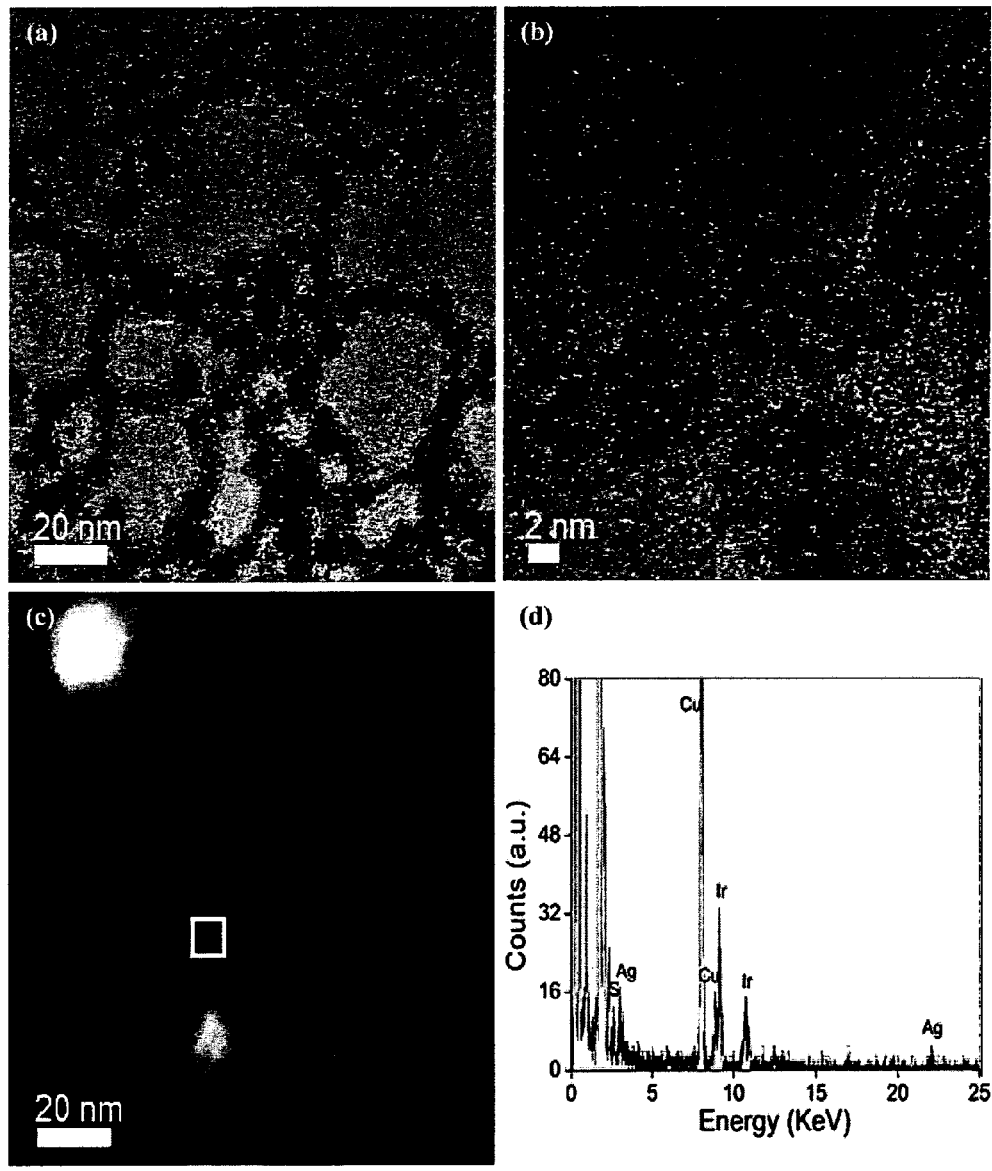
Figure S4

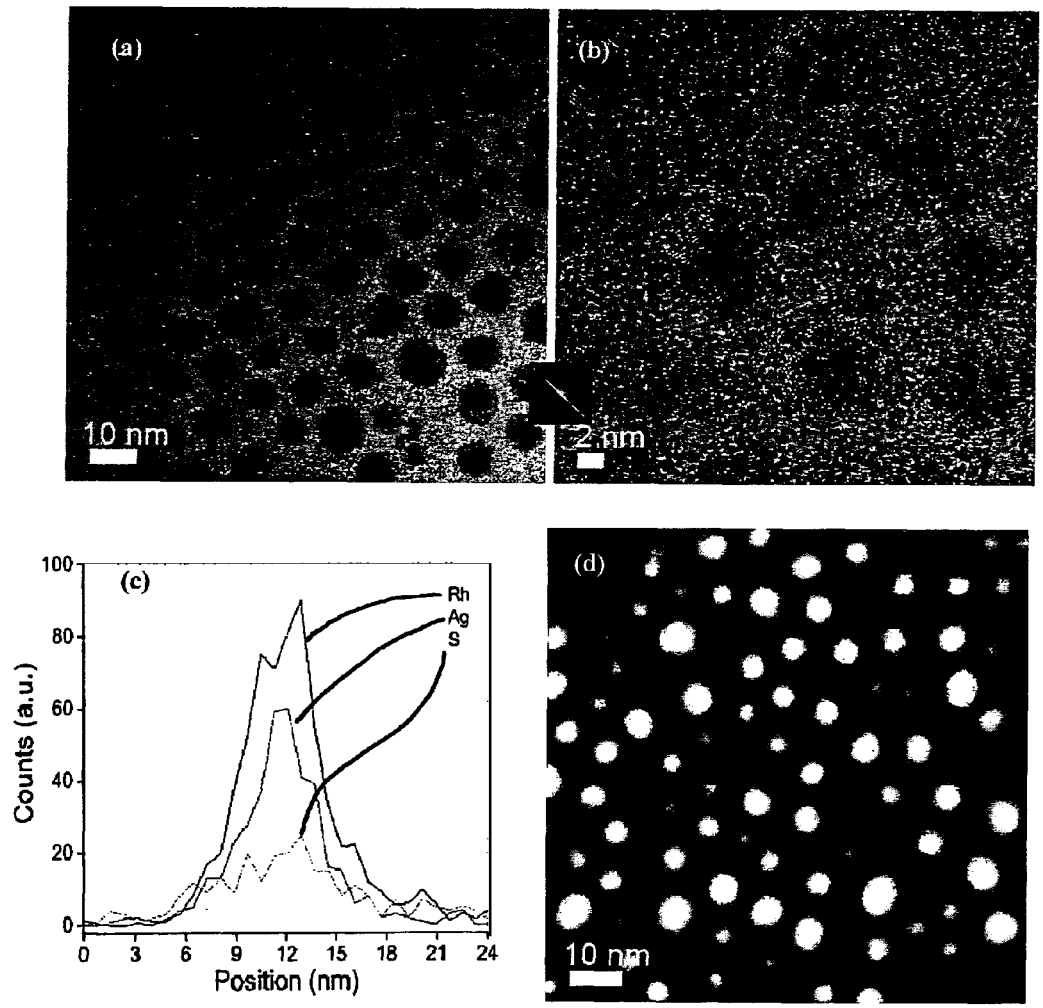
Figure S5

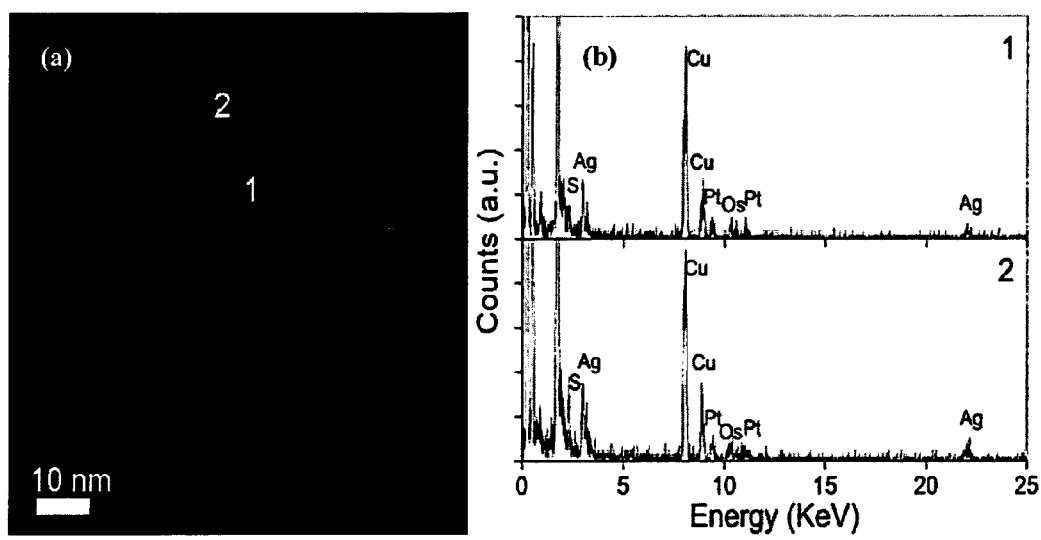
Figure S6

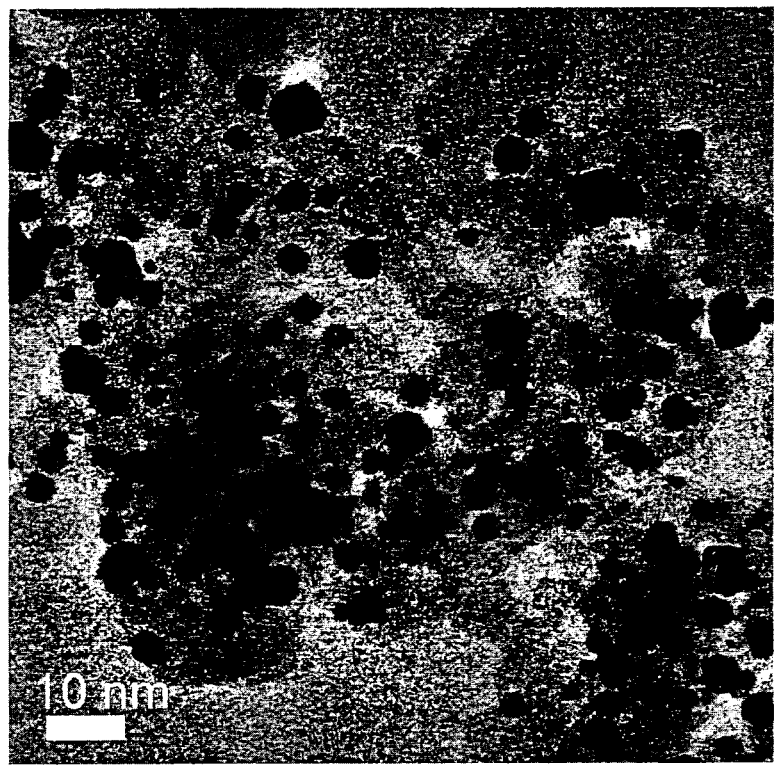
Figure S7

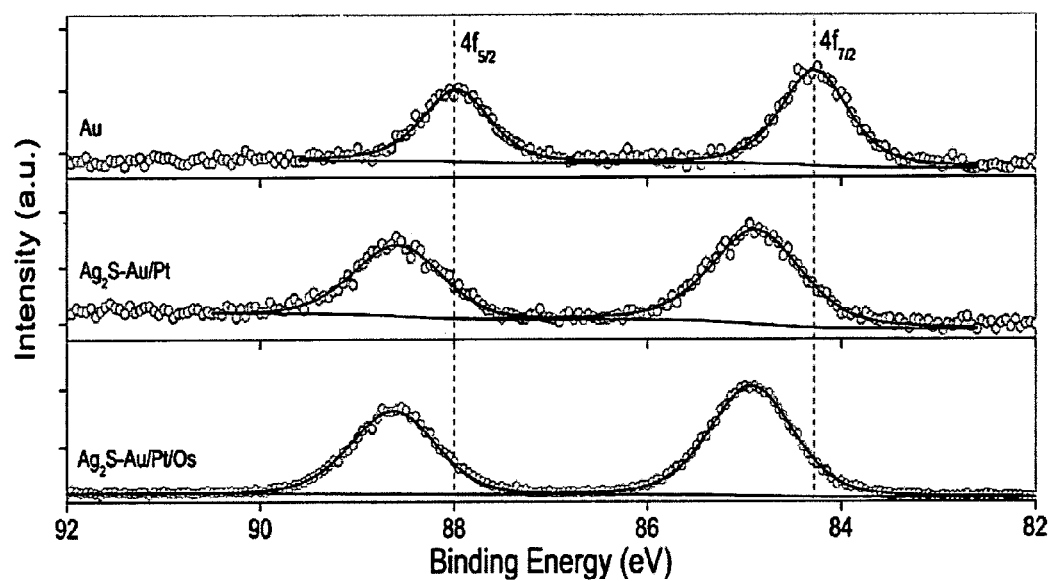
Figure S8

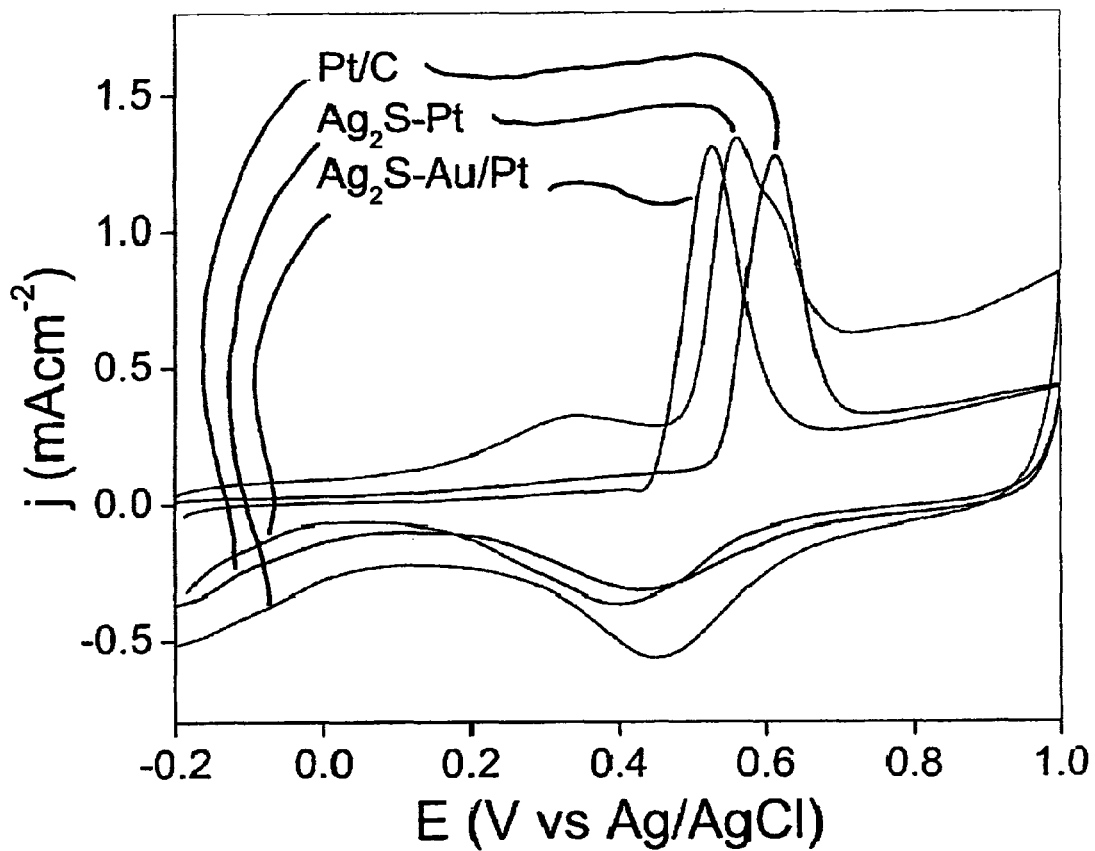
Figure S9

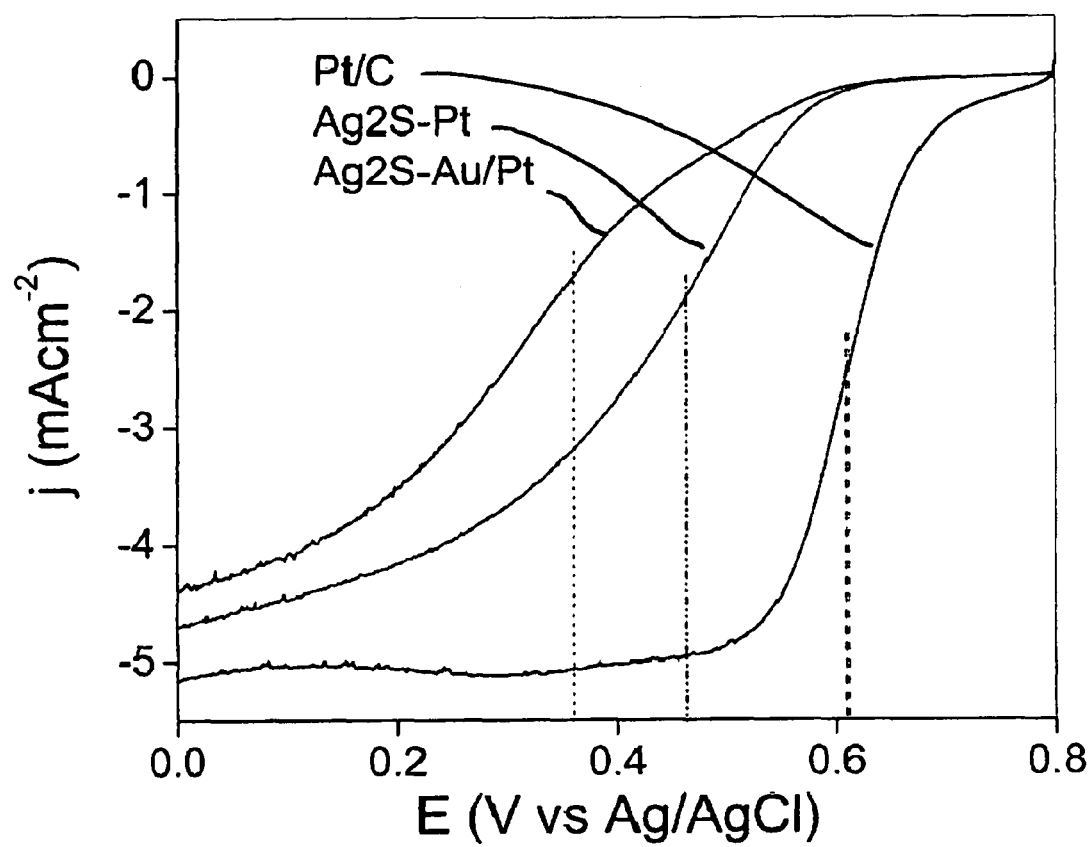
Figure S10

NANOCOMPOSITES

PRIORITY

This patent application is a US National Phase application under 35 U.S.C. §371 of International Application No. PCT/SG2011/000132, filed on Mar. 30, 2011, entitled NANOCOMPOSITES, which claims priority from U.S. provisional application 61/319,257, filed on Mar. 30, 2010, the entire contents of both of which are incorporated herein by cross reference.

TECHNICAL FIELD

The present invention relates to methods and compositions of nanocomposites comprising a silver salt and different noble metals.

BACKGROUND OF THE INVENTION

Nanostructures with discrete domains of different materials are of great interest for the integration of multiple functionalities. While continuously being attracted by the classical hybrid nanomaterials, for example, core-shell, alloy, or some other bimetallic heterostructures, research interest has also been allured into the development of semiconductor-metal nanocomposites (also called nanohybrids) made up of different classes of materials with coherent interfaces. This type of nanostructure combines materials with distinct physical and chemical properties to yield a unique hybrid nanosystem having multifunctional capabilities and tuned or enhanced useful properties, which may not be attainable in individual materials.

The preparation of semiconductor-metal nanocomposites dates back 30 years or more. Early investigations were focused on the deposition/doping of different metals (Au, Ag, or Pt) on or in $TiO_2$ powders for photocatalysis application. In these structures, the metal domain induces the charge equilibrium in photoexcited $TiO_2$ nanocrystals, which has direct influence in dictating the energetics of the nanocomposites by shifting the Fermi level to more negative potentials. The Fermi level shift is indicative of improved charge separation in $TiO_2$-metal systems and demonstrates its usefulness for enhancing the efficiency of photocatalytic reactions.

In 2004, synthesis of semiconductor-metal nanocomposites was demonstrated using a solution method to form nanohybrids by the selective growth of gold tips on the apexes of hexagonal-phase CdSe nanorods at room temperature. The new nanostructures display modified optical properties caused by the strong coupling between the gold and semiconductor sections. The gold tips show increased conductivity as well as selective chemical affinity for forming self-assembled chains of rods. The architecture of these nanostructures is qualitatively similar to bi-functional molecules such as dithiols that provide two-sided chemical connectivity for self-assembly and for electrical devices and can solve the difficult problem of contacting colloidal nanorods and tetrapods to the external world. Later the synthesis of asymmetric semiconductor-metal heterostructures was effected in which gold was grown on one side of CdSe nanocrystal rods and dots. Theoretical modelling and experimental analysis show that the one-side nanocomposites are transformed from the two-sided architectures, through a repining process. Subsequently, various approaches have been developed for the synthesis of semiconductor-metal nanocomposites by anisotropic growth of metals on semiconductors through reduction, physical deposition, or photochemistry. Examples include ZnO—Ag, CdS—Au, InAs—Au, $TiO_2$—Co, PbS—Au, $Ag_2S$—Au, and semiconductor-Pt systems.

Most recently, the present inventors contributed a general protocol to transfer the transition metal ions from water to an organic medium using an ethanol mediated method, which has been extended to synthesize a wide variety of heterogeneous semiconductor-noble metal nanocomposites (J. Yang, J. Y. Ying, *Nat. Mater.* 8, 683 (2009)). In other work, the inventors synthesized three different types of semiconductor-Au nanocomposites (CdS—Au. CdSe—Au and PbS—Au) via solution methods and tested their catalytic activities in the three-component coupling reaction of the model substrates benzaldehyde, piperidine and phenylacetylene in water. It was found that through the electronic coupling between semiconductor and Au domains, PbS—Au nanocomposites provided the highest activity, giving the desired propargylic amine product in isolated yield up to 95%.

SUMMARY OF THE INVENTION

In a first aspect of the invention there is provided nanocomposite particle comprising:

a nanoparticle, optionally a spherical nanoparticle, having a surface comprising, optionally consisting essentially of, a silver salt, optionally silver sulfide, at least one region, optionally approximately circular, of a first noble metal on said surface, optionally on only a portion of said surface, and optionally at least one region, optionally approximately circular, of a second noble metal on said surface, said second noble metal being different to the first noble metal, wherein if said first noble metal is gold, there is at least one region of the second noble metal on said surface.

The first noble metal and, if present, the second noble metal, may each independently be selected from the group consisting of gold, platinum, palladium, rhodium, osmium, silver, ruthenium and iridium.

In the case where the first metal or the second metal is gold, there may be only one region of gold on the surface of each nanoparticle although in some instances there may be more than one region of gold. In the case where the first metal or the second metal is not gold, there may be more than one region of said metal on the surface of each nanoparticle, or of some nanoparticles.

In one embodiment there is provided a nanocomposite particle comprising:

a nanoparticle having a surface comprising a silver salt, and at least one region of a first noble metal on said surface, wherein if said first noble metal is gold, there is additionally at least one region of a second noble metal on said surface, said second noble metal being different to the first noble metal.

In an embodiment there is provided a nanocomposite particle comprising:

a nanoparticle having a surface comprising (optionally consisting essentially of) a silver salt, at least one region of gold on said surface, and at least one region of a second noble metal on said surface, said second noble metal being not gold.

In another embodiment there is provided a nanocomposite particle comprising:

a nanoparticle having a surface comprising (optionally consisting essentially of) a silver salt, at least one region of a first noble metal which is not gold on said surface.

In another embodiment there is provided a nanocomposite particle comprising:
  a nanoparticle having a surface comprising (optionally consisting essentially of) a silver salt,
    at least one region of a first noble metal on said surface, and
    at least one region of a second noble metal on said surface.
  wherein neither the first not the second noble metal is gold.

The regions of noble metal may be directly adjacent the silver salt surface. There may be no region of noble metal on another region of noble metal.

In a second aspect of the invention there is provided a nanocomposite material comprising, optionally consisting essentially of, a plurality of nanocomposite particles according to the first aspect.

The nanocomposite particles of the nanocomposite material may have a mean diameter of about 3 to about 15 nm. The nanocomposite particles may be substantially monodispersed, or may have a narrow particle size distribution.

In a third aspect of the invention there is provided a process for making a nanocomposite material according to the second aspect, said process comprising:
  combining a heated aqueous mixture comprising nanoparticles, optionally monodispersed nanoparticles, optionally having a mean diameter between about 3 and about 15 nm, and a reducing agent such as citric acid with a compound or complex (for example a halide compound or complex) of a first noble metal, said nanoparticles each to having a surface comprising, optionally consisting essentially of a silver salt, optionally silver sulfide; and
  maintaining the resulting reaction mixture at an elevated temperature for sufficient time to form at least one region, optionally approximately circular, of the first noble metal on the surface of said nanoparticles, optionally on only a portion of said surface; thereby forming an aqueous dispersion of the nanocomposite material.

The process may additionally comprise the step combining the resulting aqueous dispersion with further reducing agent (such as citric acid) and a compound or complex (for example a halide compound or complex) of a second noble metal, and maintaining the resulting mixture at an elevated temperature for sufficient time to form at least one region, optionally approximately circular, of the second noble metal on the surface of said nanoparticles, said second noble metal being different to the first noble metal. The further reducing agent may be the same as the original reducing agent, or may be different thereto. The elevated temperature and time for this step may be the same as for the formation of the region(s) of the first noble metal or may be different thereto. In the event that the first noble metal is gold, this step will be conducted. In the event that the first noble metal is not gold, this step is optional.

The process may additionally comprise the step of preparing the nanoparticles by a process comprising combining an aqueous solution of a water soluble silver salt, optionally silver nitrate, and a stabilising agent such as bis(p-sulfonatophenyl)phenylphosphane dihydrate dipotassium salt with an aqueous solution of a water soluble salt comprising a counterion, optionally sulfide, capable of forming an insoluble salt with silver ions, so as to form the nanoparticles in the form of an aqueous dispersion of the silver salt of the counterion.

In an embodiment there is provided a process for making a nanocomposite material according to the second aspect, said process comprising:
  combining a heated aqueous mixture comprising nanoparticles and citric acid or citrate with a halide compound or complex of a first noble metal, said nanoparticles each having a surface consisting essentially of silver sulfide; and
  maintaining the resulting reaction mixture at an elevated temperature for sufficient time to form at least one region of the first noble metal on a portion of the surface of said nanoparticles;
  thereby forming an aqueous dispersion of the nanocomposite material.

In another embodiment there is provided a process for making a nanocomposite material according to the second aspect, said process comprising:
  combining a heated aqueous mixture comprising nanoparticles and citric acid or citrate with a halide compound or complex of gold, said nanoparticles each having a surface consisting essentially of silver sulfide;
  maintaining the resulting reaction mixture at an elevated temperature for sufficient time to form at least one region of gold on a portion of the surface of said nanoparticles;
  combining the resulting aqueous dispersion with further citric acid or citrate and a halide compound or complex of a second noble metal, and
  maintaining the resulting mixture at an elevated temperature for sufficient time to form at least one region of the second noble metal on the surface of said nanoparticles, said second noble metal being not gold;
  thereby forming an aqueous dispersion of the nanocomposite material.

In a fourth aspect of the invention there is provided a process for making a nanocomposite material according to the second aspect, said process comprising:
  combining a heated aqueous mixture comprising nanoparticles, optionally monodispersed nanoparticles, optionally having a mean diameter between about 3 and about 15 nm, and a reducing agent such as citric acid with at least two compounds or complexes (for example halide compounds or complexes) of different noble metals or with a mixed metal compound or complex comprising at least two different noble metals in the same compound or complex (for example halide compound or complex), said nanoparticles each having a surface comprising, optionally consisting essentially of, a silver salt, optionally silver sulfide;
  maintaining the resulting reaction mixture at an elevated temperature for sufficient time to form either at least one region, optionally approximately circular, of each noble metal or else at least one region, optionally approximately circular, of a mixture of the noble metals on the surface of said nanoparticles, optionally on only a portion of said surface;
  thereby forming an aqueous dispersion of the nanocomposite material.

In an embodiment there is provided a process for making a nanocomposite material according to the second aspect, said process comprising:
  combining a heated aqueous mixture comprising nanoparticles and citric acid or citrate with at least two halide compounds or complexes of different noble metals (i.e. with a halide compound or complex of a first noble metal and a halide compound or complex of a second noble metal) or with a mixed metal halide compound or complex comprising at least two different noble metals in the same compound or complex, said nanoparticles each having a surface consisting essentially of silver sulfide;
  maintaining the resulting reaction mixture at an elevated temperature for sufficient time to form either at least one region of each noble metal or else at least one region of a mixture of the noble metals on a portion of the surface of said nanoparticles;

thereby forming an aqueous dispersion of the nanocomposite material

The process of the third or fourth aspect may additionally comprise adding to the aqueous dispersion of the nanocomposite material a solution of an amine, preferably a C8 to C18 amine, in a water soluble organic solvent, optionally a water soluble alcohol, and agitating the resulting mixture with a second solvent, preferably an aromatic hydrocarbon, which forms a two phase system with said mixture, so as to transfer the nanocomposite material to the second solvent and form a dispersion of the nanocomposite material in the second solvent.

In a fifth aspect of the invention there is provided a method for adsorbing a nanocomposite material according to the second aspect onto a substrate, e.g. onto particulate carbon comprising combining a dispersion, optionally a dispersion in an organic solvent such as an aromatic hydrocarbon, of said nanocomposite material with the substrate (e.g. the particulate carbon) and agitating the resulting mixture for sufficient time to adsorb the nanocomposite material onto the surface of the particulate carbon.

In a sixth aspect of the invention there is provided an electrode comprising:

a glassy carbon electrode; and a coating composition comprising a nanocomposite material according to the second aspect adsorbed onto a particulate carbon, said coating composition being disposed on, optionally coupled to, the surface of the glassy carbon electrode.

DETAILED DESCRIPTION

The invention as disclosed herein is directed to nanocomposite compositions comprising silver salts, e.g. $Ag_2S$, and different noble metals and the synthesis of nanocomposites consisting of silver salts, e.g. $Ag_2S$, and different noble metals. The silver salt is commonly a silver (I) salt. By reducing various noble metal precursors using citrate in aqueous phase in the presence of previously formed nanocrystals of the silver salt, uniform semiconductor-noble metal heterogeneous nanostructures were obtained as the dominant product. In addition to the binary nanocomposites, ternary and quadruple hybrid systems were achieved by successive deposition of different noble metals on $Ag_2S$ nanocystals. Of these, the Pt containing nanocomposites exhibit superior catalytic activity toward the methanol oxidation, the key reaction in direct methanol fuel cell, due to the relative smaller Pt sizes and electronic coupling between semiconductor and noble metal domains.

One aspect of the invention is a nanocomposite particle comprising a nanoparticle having a surface comprising a silver salt, and at least one region of a first noble metal, and optionally at least one region of a second noble metal, wherein the second noble metal is different from the first noble metal. If the first noble metal is gold, there is at least one region of a second noble metal on the particle surface. In the event that one of the noble metals is gold, there is commonly no more than one region of gold, optionally approximately circular, on each nanoparticle. For other noble metals there may be one or more region thereof on the surface of each nanoparticle, e.g. 2, 3, 4 or 5 regions. In some embodiments the region of noble metal completely covers the entire surface of the nanoparticle. In other embodiments it (or they) only cover a portion of the surface. Each region of noble metal may cover from about 1 to about 100% of the surface area of the nanoparticle, or about 1 to 50, 1 to 20, 1 to 10, 1 to 5, 5 to 100, 10 to 100, 20 to 100, 50 to 100, 5 to 50, 5 to 20, 5 to 10, 10 to 50 or 50 to 80%, e.g. about 1, 2, 3, 4, 5, 10, 15, 20, 25, 30, 35, 40, 45, 50, 55, 60, 65, 70, 75, 80, 85, 90, 95 or 100% of the surface of the nanoparticle. In some embodiments, the nanoparticle is essentially spherical. In some embodiments, the silver salt consists essentially of silver sulfide. In some embodiments the nanoparticles consist essentially of the silver salt, commonly silver sulfide, together with the noble metal region(s) on the surface thereof. In some embodiments the or each region of noble metal is essentially circular. The nanoparticle of the nanocomposite may be about 2 to about 15 nm in diameter, or about 2 to 10, 2 to 5, 5 to 15, 10 to 15 or 5 to 10 nm, e.g. about 2, 3, 4, 5, 6, 7, 8, 9, 10, 11, 12, 13, 14 or 15 nm. In some cases the nanoparticle may be somewhat larger, e.g. about 20, 25, 30, 35, 40, 45 or 50 nm. The nanoparticle may be substantially crystalline. It may be for example crystalline silver sulfide. The regions of noble metal may be essentially the same size, or may vary in size. They may each be about 0.2 to 2 nm in diameter (provided that they are no larger, preferably smaller, than the surface of the nanoparticle on which they are located). They may each be about 0.2 to about 1 nm in diameter, or about 0.2 to 0.5, 0.5 to 2, 1 to 2 or 0.5 to 1 nm in diameter, e.g. about 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 nm in diameter.

In some embodiments, the first noble metal, and the second noble metal if present are selected independently from the group consisting of gold, platinum, palladium, rhodium, osmium, silver, ruthenium, and iridium, with the proviso that if the first noble metal is gold, there is at least one other region of a noble metal which is not gold on the surface of the nanoparticles.

In some embodiments, the nanocomposite material comprises a plurality of nanocomposite particles. In some embodiments, the nanocomposite particles have a mean diameter of about 3 nm to about 15 nm, or about 3 to 10, 3 to 5, 5 to 15, 10 to 15 or 5 to 10 nm and are preferably substantially monodispersed. In some embodiments the nanoparticles have a mean (either number average or weight average) diameter of 3, 4, 5, 6, 7, 8, 9, 10, 11, 12, 13, 14 or 15 nm. In some cases the nanoparticles may be somewhat larger, e.g. about 20, 25, 30, 35, 40, 45 or 50 nm. The nanoparticle may be substantially crystalline.

Another aspect of the invention is a process for making a nanocomposite material. One suitable process comprises combining a heated aqueous mixture comprising nanoparticles and a reducing agent with a compound or complex of a first noble metal to form a reaction mixture, wherein surface of nanoparticles comprises a silver salt. The silver salt may be, or may comprise, silver sulfide. The nanoparticle may consist essentially of the silver salt, e.g. of silver sulfide. The heated aqueous mixture may be maintained at an elevated temperature for some time before adding the compound or complex of the first noble metal. A suitable time is about 0.5 to 2 hours, or about 0.5 to 1 or 1 to 2 hours, e.g. about 0.5, 0.75, 1, 1.25, 1.5, 1.75 or 2 hours. The elevated temperature may be a reflux temperature. It may be between about 100 and about 120° C., or about 100 to 110, 110 to 120 or 105 to 115° C., e.g. about 100, 105, 110, 115 or 120° C. The reducing agent may be used in a molar excess over the compound or complex of the first noble metal. The molar ratio of reducing agent to the compound or complex of the noble metal may be about 1 to about 10 (i.e. about 1:1 to about 10:1) or about 1 to 5, 1 to 2, 2 to 10, 5 to 10 or 3 to 7, e.g. about 1, 1.1, 1.2, 1.3, 1.4, 1.5, 2, 2.5, 3, 3.5, 4, 4.5, 5, 5.5, 6, 6.5, 7, 7.5, 8, 8.5, 9, 9.5 or 10. The reaction mixture is then maintained at an elevated temperature (which may be the same as or different to the earlier elevated temperature and may be within the same range as provided above) for a sufficient time to form at least one region of the first noble metal on the surface of said nanoparticle. The sufficient time may be from about 10 minutes to about 24 hours, or about 0.5 to 24 hours, or about 1 to 24, 6 to 24, 12 to 24, 18 to 24, 0.5 to 15, 0.5 to 10, 0.5 to 5, 1 to 15, 5 to 15, 1 to 5, 10 to 15 or 5 to 10 hours, e.g. about 10, 15, 20, 25, 30, 40 or 50 minutes or about 1, 2, 3, 4, 5, 6, 7, 8, 9, 10, 11, 12, 13, 14, 15, 16, 17, 18, 19, 20, 21, 22, 23 or 24 hours. Optionally the resulting dispersion is combined with further reducing agent and a compound or complex of a second noble metal, and the resulting mixture is maintained at an elevated temperature for sufficient time to form at least one region of the second noble metal on the surface of said nanoparticles. In this option the second noble metal is different from said first noble metal. In this option an aqueous dispersion of the nanocomposite material is formed in which the nanoparticles of the nanocomposite have at least region of each of the first and second noble metal on the surface thereof. In this case, the ranges of conditions (temperature, molar excess, time etc.) described above may apply for the second noble metal deposition step also (although the actual conditions may not be the same for the two steps).

In some embodiments, the reducing agent is, or comprises, citric acid or citrate or a mixture of these. The reducing agent may be an organic reducing agent. It may be a non-metallic reducing agent. It may be a metallic reducing agent. Additional reducing agents suitable for use with the invention are well known to persons of skill in the art. In some embodiments the compound or complex is a halide compound or complex. The halide may be chloride, bromide or a mixture of these. Additional compounds or complexes suitable for use with the invention will be well known to persons of skill in the art. In some embodiments the silver salt is silver sulfide. Additional silver salts suitable for use with the invention will be well known to persons of skill in the art. These may be any suitably water insoluble silver (I) salt, e.g. silver selenide, silver phosphate etc.

In some embodiments, the nanoparticles are prepared by a process comprising combining an aqueous solution of a water soluble silver salt, optionally silver nitrate or silver acetate, and a stabilising agent such as a bis(p-sulfonatophenyl)phenylphosphane salt (e.g. dipotassium salt, commonly used as the dehydrate) with an aqueous solution of a water soluble salt comprising a counterion, optionally sulfide, phosphate, selenide etc., capable of forming an insoluble salt with silver ions, so as to form the nanoparticles in the form of an aqueous dispersion of the silver salt of the counterion. In particular embodiments, an aqueous solution of the water soluble silver salt is exposed to the stabilising agent for sufficient time to form a complex between the stabilising agent and the silver ions. This complex may then be treated with the counterion in order to form the nanoparticles, optionally in the form of a dispersion. This reaction may conveniently be conducted at room temperature or at any other suitable temperature, commonly between about 15 and about 30° C., or about 15 to 25, 15 to 20, 20 to 30, 25 to 30 or 20 to 25° C., e.g. about 15, 20, 25 or 30° C.

Another aspect of the invention is a process for making a nanocomposite material comprising combining a heated aqueous mixture comprising nanoparticles, optionally monodispersed nanoparticles, optionally having a mean diameter between about 3 and about 15 nm, and a reducing agent such as citric acid with at least two compounds or complexes (for example halide compounds or complexes) of different noble metals or with a mixed metal compound or complex comprising at least two different noble metals in the same compound or complex (for example halide compound or complex), said nanoparticles each having a surface comprising, optionally consisting essentially of, a silver salt, optionally silver sulfide. The resulting reaction mixture is maintained at an elevated temperature for sufficient time to form either at least one region, optionally approximately circular, of each noble metal or else at least one region, optionally approximately circular, of a mixture of the noble metals on the surface of said nanoparticles, optionally on only a portion of said surface, thereby forming an aqueous dispersion of the nanocomposite material. This aspect is similar to the earlier described process for making the nanocomposite particles, however in using a mixture of metals, either discrete regions of the different metals or regions of mixed metal are formed on the surface of the nanoparticles. In some instances some regions of mixed metals and some regions of individual metals may form, either on the same nanoparticle or on different nanoparticles. This option provides the possibility to provide nanoparticles having regions of mixed metals. It also provides the possibility of providing nanoparticles having discrete regions of different noble metals in a single step rather than in a sequential two step process as described earlier.

Once formed, it may be useful to transfer the nanoparticles to a more suitable solvent for further use. Thus in some embodiments, the process comprises adding to the aqueous dispersion of the nanocomposite material a solution of an amine or other transfer agent in a water soluble organic solvent, and agitating the resulting mixture with a second solvent which forms a two-phase system, so as to transfer the nanocomposite material to the second solvent and form a dispersion of the nanocomposite material in the second solvent. In some embodiments, the amine is a C8 to C18 amine (e.g. C8 to C12, C12 to C16 or C10 to C14). In some embodiments, the amine is a C8, C9, C10. C11, C12, C13, C14, C15, C16, C17, or a C18 amine, or may be a mixture of any two or more of these. In some embodiments, the water soluble organic solvent is a water soluble alcohol (e.g. methanol, ethanol, isopropanol, tert-butanol). Additional water soluble organic solvents suitable for use with the invention will be well known to persons of ordinary skill in the art. Commonly the second solvent is a non-polar solvent. This may be useful in cases where contacting the nanoparticles with a non-polar substance is required. In some embodiments, the second solvent is an aromatic hydrocarbon, e.g. benzene, toluene, xylene or mixtures thereof. Additional solvents suitable for use with the invention will be well known by persons of skill in the art.

Another aspect of the invention is a method for adsorbing a nanocomposite material as described herein onto a particulate carbon or some other substrate (optionally particulate and/or hydrophobic substrate), comprising combining a dispersion of the nanocomposite material with the particulate carbon or other substrate and agitating the resultant mixture for sufficient time to adsorb the nanocomposite material onto the surface of the particulate carbon or other substrate. In some embodiments, the dispersion is in an organic solvent. In the event that the substrate is hydrophobic, it may be useful to use a dispersion of the nanocomposite material in a hydrophobic solvent. In some embodiments, the organic solvent is a hydrocarbon, commonly an aromatic hydrocarbon, e.g. benzene, toluene, xylene or mixtures thereof.

Another aspect of the invention is an electrode comprising a glassy carbon electrode, and a coating composition comprising a nanocomposite material as described herein adsorbed onto a particulate carbon, the coating composition being, disposed on the surface of the glassy carbon electrode. In some embodiments, the coating composition is coupled to the surface of the glassy carbon electrode. The electrode may be used for catalysing oxidation of methanol. The invention also encompasses the coating composition itself, i.e. a nanocomposite material as described herein adsorbed onto a particulate carbon (or some other substrate, commonly particulate and commonly hydrophobic). The nanocomposite material may in this case comprise nanoparticles in which at least one noble metal region on the surface thereof is platinum and/or palladium. For electrode applications, platinum regions on the nanoparticles may be particularly suitable.

Each of the embodiments of the invention as described herein can be combined with each of the different aspects of the invention.

In the present specification the term "comprise" and related terms indicates that the specified integer is present however other integers may also be present. The term "consisting essentially of" may be construed as either "consisting exclusively of" or as allowing for minor other integers which are not added intentionally and which do not substantially affect the operation of the invention. Thus for example a metal which "comprises" gold must contain gold and may optionally contain other metals, however a metal which "consists essentially" of gold contains gold and optionally minor adventitious impurities that are not present intentionally and which do not affect the working of the invention.

BRIEF DESCRIPTION OF THE DRAWINGS

Embodiments of the present invention will now be described, by way of an example only, with reference to the accompanying drawings wherein.

Figure 1:
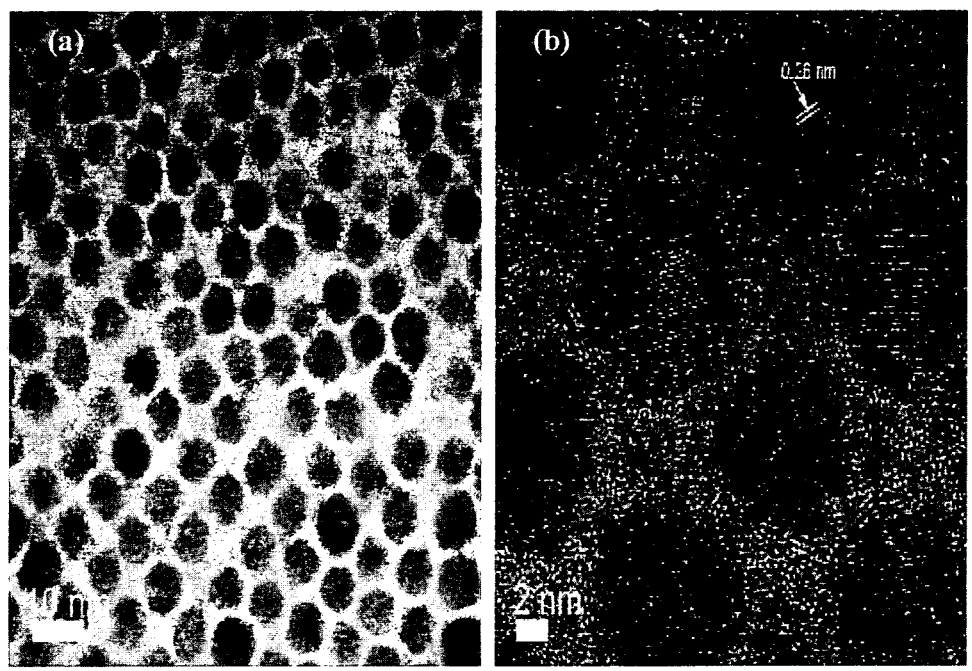
FIG. 1 illustrates $Ag_2S$ nanocrystals. (a) TEM and (b) HRTEM images of the as-prepared $Ag_2S$ nanocrystals. $\bar{d}$=7.2 nm, $\sigma$=0.6 nm, $\bar{\sigma}$=8.4%.

FIG. S1 illustrates XRD pattern of the as-prepared Ag2S nanocrystals. Insert shows the peak positions for the monoclinic $Ag_2S$ phase (JCPDS Card File 14-0072).

FIG. S2 illustrates $Ag_2S$—Au nanocomposites at different $Au/Ag_2S$ precursor ratios. TEM images (a, c) and HRTEM images (b, d) of $Ag_2S$—Au nanocomposites synthesized with $Au/Ag_2S$ precursor molar ratios of 1:2 (a,b) and 2:1 (c,d), respectively.

FIG. S3 illustrates $Ag_2S$—Pt nanocomposites at different $Pt/Ag_2S$ precursor ratios. TEM images (a, c) and STEM images (b, d) of $Ag_2S$—Pt nanocomposites synthesized with $Pt/Ag_2S$ precursor molar ratios of 1:2 (a,b) and 2:1 (c,d), respectively.

FIG. S4 illustrates $Ag_2S$—Ir nanocomposites. (a) TEM image, (b) HRTEM image, (c) HAADF-STEM image of $Ag_2S$—Ir nanocomposites, and (d) EDX analysis of the nanocomposites boxed in (c). Nanonets of $Ag_2S$—Ir nanocomposites were formed with deposited Ir of about 1.3 nm.

FIG. S5 illustrates $Ag_2S$—Rh nanocomposites. (a) TEM image, (b) HRTEM image, (c) HAADF-STEM image of $Ag_2S$—Rh nanocomposites, and (d) Rh, Ag and S element profiles obtained from EDX analysis along the white line across one nanocomposite (inset). A continuous Rh shell was formed on each $Ag_2S$ nanocrystal.

FIG. S6 illustrates $Ag_2S$—Pt/Os nanocomposites. (a) HAADF-STEM image, (b) EDX analysis of single nanocomposite labeled in (a). Domains of Pt and Os of about 1 nm were formed independently on each $Ag_2S$ nanocrystal by successive reduction of Pt and Os precursors in aqueous solution.

FIG. S7 illustrates commercial Pt/C catalysts. TEM image of the Pt/C (E-TEK) catalysts, which consisted of about 3.5 nm Pt nanoparticles (20 wt %) on Vulcan XC-72 carbon support.

FIG. S8 illustrates Au XPS spectra. 4f XPS spectra of Au in monometallic Au particles and in the Pt-containing $Ag_2S$-noble metal nanocomposites.

FIG. S9 illustrates CO stripping test. Room temperature CO stripping from the commercial Pt/C and Pt-containing $Ag_2S$-metal ($Ag_2S$—Pt and $Ag_2S$—Au/Pt) nanocomposites in 0.1 M $HClO_4$.

FIG. S10 illustrates comparison of the ORR catalytic activity of Pt/C and Pt-containing $Ag_2S$-metal nanocomposites. ORR polarization curves for the commercial Pt/C catalysts, $Ag_2S$—Pt, and $Ag_2S$—Au/Pt nanocomposites recorded at room temperature in an $O_2$-saturated 0.1 M $HClO_4$ solution with a sweep rate of 20 mV·s$^{-1}$ and a rotating rate of 1600 rpm.

DETAILED DESCRIPTION OF PARTICULAR EMBODIMENTS

The present invention provides a facile, aqueous route to synthesize nanocomposites consisting of $Ag_2S$ and different noble metals. In this approach, Ag$_2$S nanocrystals with an average size of 7 nm were used as seeds for the growth of different noble metals upon the reduction of various metal precursors by citrate in an aqueous solution. In addition to the binary nanocomposites, ternary and quadruple hybrid systems were achieved by successive deposition of different noble metals on Ag$_2$S nanocrystals. Of these, the Pt containing nanocomposites exhibit superior catalytic activity toward the methanol oxidation, the key reaction in direct methanol fuel cell (DMFC), due to the relative smaller Pt sizes and electronic coupling between the semiconductor and noble metal domains.

In the first step, the inventors developed a room-temperature method to synthesize aqueous-dispersible Ag$_2$S nanocrystals. Typically, 600 mg of bis(p-sulfonatophenyl)phenylphosphane dihydrate dipotassium salt (BSPP) was added to 300-mL of 1 mM aqueous AgNO$_3$ solution hosted in a 1000-mL beaker. The mixture was stirred for 1 hour for the formation of BSPP-Ag(I) complexes, followed by prompt addition of 10-mL of 50 mM aqueous Na$_2$S solution, which resulted in a series of color changes before finally arriving at a brown solution, indicating the formation of Ag$_2$S hydrosol. A transmission electron microscopy (TEM) image of the as-prepared Ag$_2$S nanocrystals is shown in FIG. 1a. The nanocrystals were spherical, nearly mono-dispersed, and had an average size of 7.2 nm. The high-resolution TEM (HR-TEM, FIG. 1b) image illustrated the lattice planes in these nanocrystals, showing an interplanar spacing of about 0.26 nm, which corresponds to the (121) planes of monoclinic Ag$_2$S. The successful synthesis of monoclinic Ag$_2$S nanocrystals was proven by powder X-ray diffraction (XRD) pattern (FIG. S1, JCPDS 140072).

These Ag$_2$S nanocrystals were then used as seeds for the formation of nanocomposites with different metals. Sodium citrate was added to the Ag$_2$S hydrosol as reducing agent at refluxed state, followed by introduction of various noble metal precursors. The reaction temperature was controlled at 105° C. for gold and 110° C. for other noble metals, respectively. Under the experimental conditions used here, metals nucleate preferentially on the existing Ag$_2$S nanocrystals, rather than homogeneously. The nanocomposite products were revealed by the typical microscopy images in FIG. 2. The deposition of noble metals on the Ag$_2$S nanocrystals is clearly identified by the appearance of brightness contrast and confirmed by the energy-dispersive X-ray spectroscopy (EDX) analysis of an arbitrary single particle under the mode of high-angle annular dark-field scanning TEM (HAADF-STEM). It is noteworthy that in the absence of Ag$_2$S (or other silver salt) nanoparticles, the reduction of Pd or Os precursors by citrate in aqueous phase is not possible, suggesting that the Ag$_2$S nanocrystals can catalyze this reduction process, analogous to the reduction of Au(III) ions catalyzed by Ag$_2$S or PbS in toluene.

Figure 2:
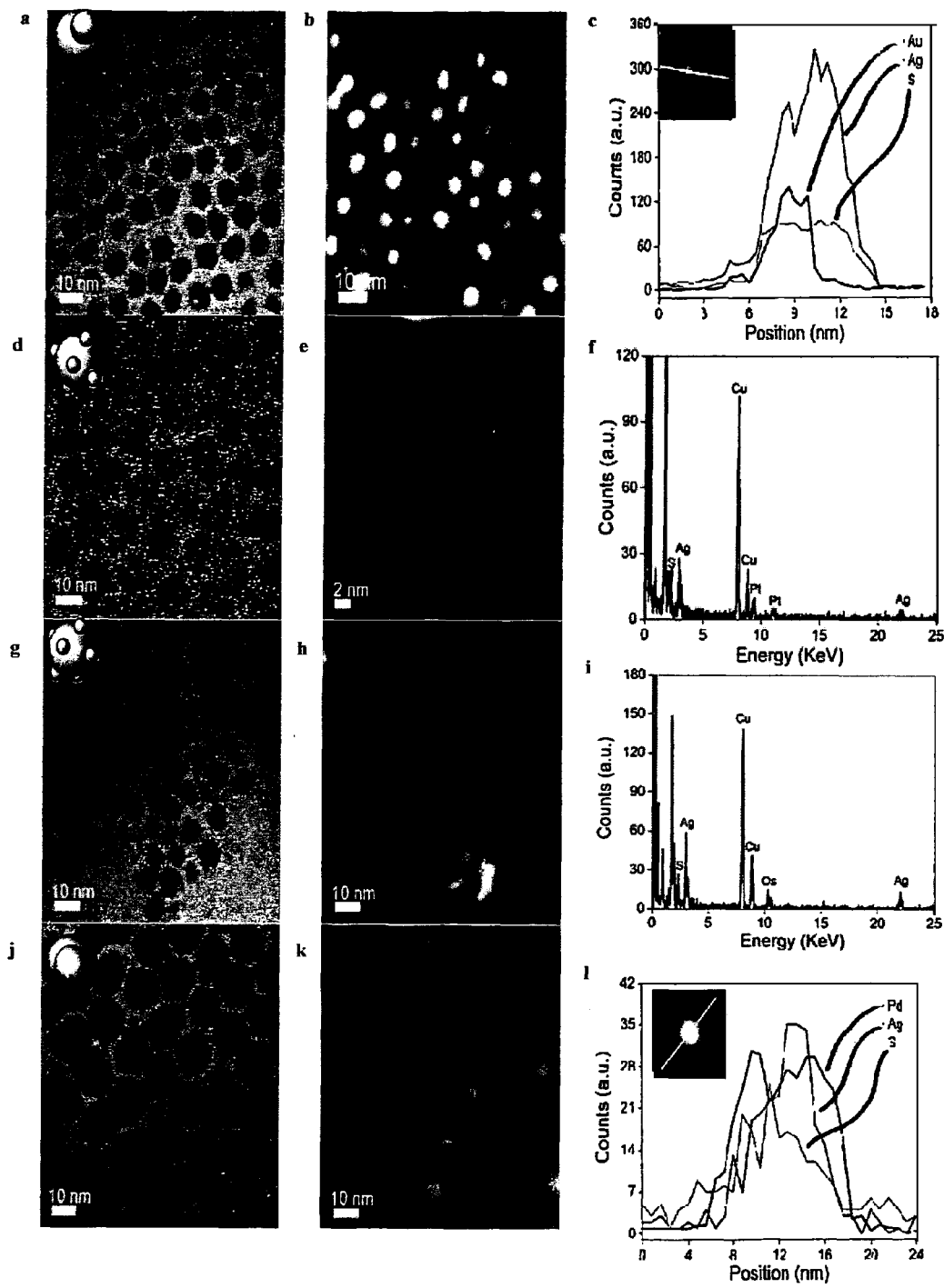
FIG. 2 illustrates binary $Ag_2S$-noble metal nanocomposites. TEM image (a), HAADF-STEM image (b), and Au, Ag and S element profiles (c) of $Ag_2S$—Au nanocomposites synthesized at $Au/Ag_2S$ precursor molar ratios of 1:1. Au of about 3 nm was deposited at a single site of each $Ag_2S$ nanocrystal. The profiles were obtained from EDX analysis along the white line across one nanocomposite (inset of c), TEM image (d), HAADF-STEM image (e), and EDX analysis (f) of $Ag_2S$—Pt nanocomposites synthesized at $Pt/Ag_2S$ precursor molar ratios of 1:1. Pt of about 1.1 nm was deposited at multiple sites of each $Ag_2S$ nanocrystal. The EDX analysis was carried on one nanocomposite indicated by the arrow in (e), TEM image (g), HAADF-STEM image (h), and EDX analysis (i) of $Ag_2S$—Os nanocomposites synthesized at $Os/Ag_2S$ precursor molar ratios of 1:1. Os of about 1.2 nm was deposited at multiple sites of each $Ag_2S$ nanocrystal. The EDX analysis was carried on one nanocomposite indicated by the arrow in (h), TEM image (j), HAADF-STEM image (k) and Pd, Ag and S element profiles (l) of $Ag_2S$—Pd nanocomposites synthesized at $Pd/Ag_2S$ precursor molar ratios of 2:1. A continuous Pd shell was formed on each $Ag_2S$ nanocrystal. The profiles were obtained from EDX analysis along the white line across one nanocomposite (inset of l).

It is interesting to note the different behaviours of metal deposition on each Ag$_2$S nanocrystal. As illustrated in FIG. 2, gold is deposited only at a single site on each Ag$_2$S nanocrystal, whereas the nucleation and growth of Pt and Os occur at multiple sites on the same. Different from reported CdSe—Au and PbS—Au systems, changes in metal precursor/Ag$_2$S ratio do not alter the morphology of the semiconductor-noble metal nanocomposites, only result in the size change of metal domains on each Ag$_2$S nanocrystals. FIG. S2 and FIG. S3 show the morphology of Ag$_2$S—Au and Ag$_2$S—Pt nanocomposites respectively, synthesized at other metal precursor/semiconductor ratios than those in FIG. 2, clearly demonstrating the neglected changes in morphology of nanocomposites.

Ag$_2$S—Ir nanocomposites were analogous to those of Ag$_2$S—Pt or Ag$_2$S—Os (FIG. S4). However, the nucleation of Ir on the Ag$_2$S nanocrystals usually induces the aggregation of the final nanocomposite products, resulting in the formation of Ag$_2$S—Ir nanonets. The high-reproducible 'nanonet' structure composed of interconnected Ag$_2$S—Ir hybrids may possibly be from the fusion of Ag$_2$S nanocrystals during the nucleation and growth of Ir nanoparticles.

The final morphology of the nanocomposites depends on whether the surface of substrate particles allows only a single nucleation site or multiple ones. Unlike the face-centered cubic (fcc) or hexagonal materials, monoclinic Ag$_2$S has very complicated crystal structures. It has many facets with different lattice spacing (see Table S1 for the lattice spacing of different planes of Ag$_2$S), which provide favourable sites to match the lattice planes of various noble metals for their epitaxial growth on the substrate seeds, which has been used to account for the formation of Fe$_3$O$_4$—Au, PbS—Au hybrids, and Pd—Pt heterostructures.

TABLE S1

The facets and lattice spacing of monoclinic Ag$_2$S (JCPDS 140072).

| Facets | d spacing (Å) | Facets | d spacing (Å) | Facets | d spacing (Å) |
|---|---|---|---|---|---|
| ($\bar{1}$01) | 3.960 | (031) | 2.213 | (040) | 1.733 |
| (110) | 3.571 | (122) | 2.093 | ($\bar{2}$13) | 1.718 |
| ($\bar{1}$11) | 3.437 | (200) | 2.083 | (041) | 1.691 |
| (012) | 3.383 | (023) | 2.072 | (114) | 1.610 |
| (111) | 3.080 | (103) | 2.047 | ($\bar{1}$41) | 1.587 |
| ($\bar{1}$12) | 2.836 | ($\bar{1}$31) | 1.995 | ($\bar{2}$23) | 1.579 |
| (120) | 2.664 | ($\bar{1}$23) | 1.963 | ($\bar{2}$04) | 1.554 |
| ($\bar{1}$21) | 2.606 | (004) | 1.935 | ($\bar{1}$05) | 1.540 |
| (022) | 2.583 | (131) | 1.918 | (015) | 1.513 |
| (112) | 2.456 | ($\bar{2}$12) | 1.903 | (231) | 1.483 |
| (121) | 2.440 | (014) | 1.866 | (213) | 1.470 |
| (013) | 2.421 | ($\bar{1}$14) | 1.816 | (134) | 1.459 |
| ($\bar{1}$03) | 2.383 | ($\bar{2}$21) | 1.798 | (232) | 1.379 |

The experimental results showed that only a single site on the Ag$_2$S nanocrystal surface was suitable for the nucleation of gold clusters, but multiple sites distributed over the entire surface of Ag$_2$S could seed for Pt, Os, and Ir noble metals. An extreme case is seen in Ag$_2$S—Pd system (FIG. 2d). Numerous sites are provided for the nucleation of Pd nanoparticles, which can grow and eventually coalesce to form a continuous shell on each Ag$_2$S nanocrystal. Analogous results were also observed in Ag$_2$S—Rh system, where the formation of continuous Rh shell on each Ag$_2$S seed was clearly identified by the TEM and EDX characterizations of the element profiles (FIG. S5).

Figure 3:
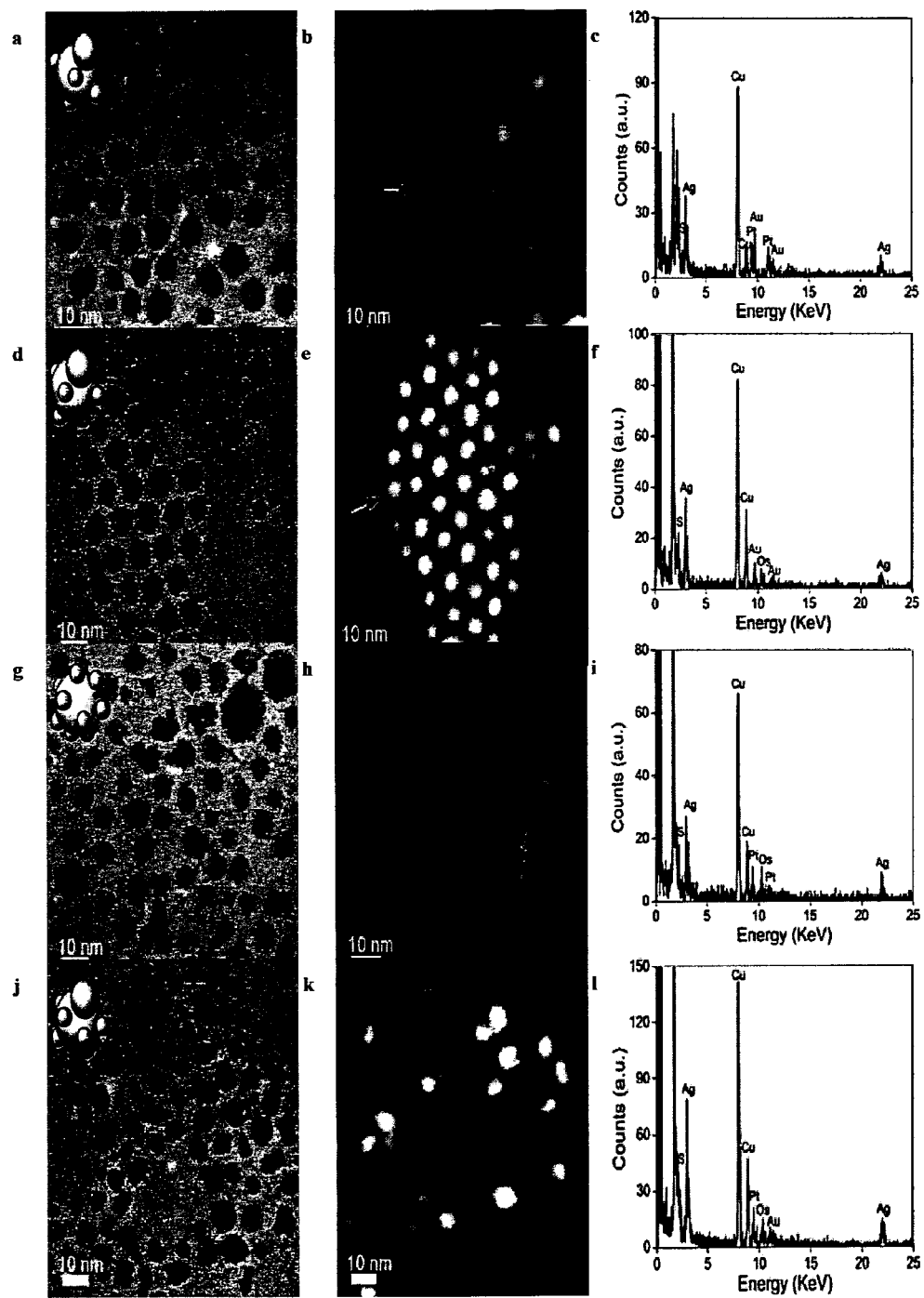
FIG. 3 illustrates multiple $Ag_2S$-noble metal nanocomposites at metal/$Ag_2S$ precursor molar ratio of 1:1. TEM image (a), HAADF-STEM image (b), and EDX analysis (c) of $Ag_2S$—Au/Pt nanocomposites. The EDX analysis was carried out one nanocomposite indicated by the arrow in (b), TEM image (d), HAADF-STEM image (e), and EDX analysis (f) of $Ag_2S$—Au/Os nanocomposites. The EDX analysis was carried on one nanocomposite indicated by the arrow in (e), TEM image (g), HAADF-STEM image (h), and EDX analysis (i) of $Ag_2S$—Pt/Os nanocomposites. The EDX analysis was carried out on one nanocomposite indicated by the arrow in (h), TEM image (j), HAADF-STEM image (k), and EDX analysis (l) of $Ag_2S$—Au/Pt/Os nanocomposites. The EDX analysis was carried out on one nanocomposite indicated by the arrow in (k).

The species-dependent features of noble metal deposition of Ag$_2$S nanocrystal could be further employed to synthesize multiple semiconductor-metal nanocomposites. The inventors have prepared ternary Ag$_2$S—Au/Pt, Ag$_2$S—Au/Os, Ag$_2$S—Pt/Os, and quadruple Ag$_2$S—Au/Pt/Os semiconductor-metal nanocomposites by successive reduction of noble metal precursors using citrate in the presence of preformed Ag$_2$S nanocrystals. Typical microscopic images and related characterizations of the multiple nanocomposites were shown in FIG. 3. By comparison with the images in FIG. 2, the domains with enhanced contrast and larger particle size (about 3 nm) in the multiple nanocomposites could be indexed to gold, whereas other noble metals in the same nanocomposites appeared in smaller dots (about 1 nm, for Pt and Os). For the Ag$_2$—Pt/Os system, since Pt and Os have the approximate domain size and imaging contrast on the Ag$_2$S substrate (FIGS. 3g and 3h), it is difficult to differentiate the Pt and Os domains in each nanocomposite. The presence of Pt, Os, and $Ag_2S$ in each composite particle could be confirmed by the EDX analysis carried out on an arbitrary single particle under the HAADF-STEM mode (FIG. 3i and FIG. S6). The growth of more than one type of metal on each $Ag_2S$ nanocrystal reversibly suggests that the nucleation sites on the $Ag_2S$ nanocrystal surface are specific to different metals, leading the integration of different materials in one nanocomposite and providing a simple and flexible route for fabricating nanostructured materials with novel structures and multiple functionalities.

Figure 4:
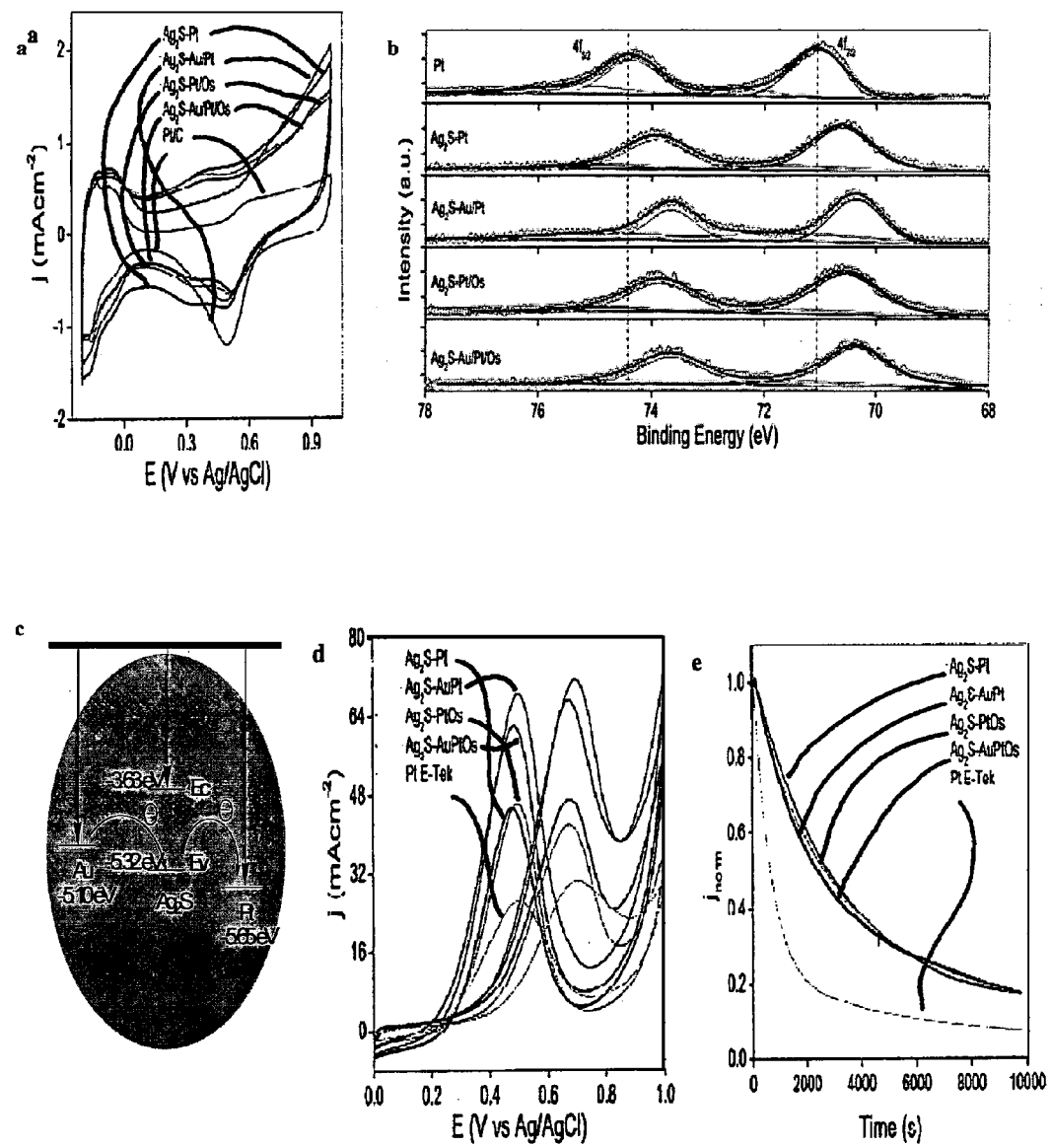
FIG. 4 illustrates characterization of Pt-containing $Ag_2S$-noble metal nanocomposites. (a) Cyclic voltammograms of Pt-containing nanocomposites in argon-purged 0.1 M $HClO_4$. Sweep rate 50 mV s$^{-1}$; room temperature. (b) Pt 4f XPS spectra of the Pt-containing $Ag_2S$-noble metal nanocomposites. (c) Energy level diagram for $Ag_2S$-noble metal nanocomposites predicts intraparticle charge transfer among different domains. (d) Cyclic voltammograms of Pt-containing nanocomposites in argon-purged 0.1 M $HClO_4$ with 1 M methanol. Sweep rate: 20 mV s$^{-1}$; room temperature. (e) Chronoamperograms of Pt-containing nanocomposites at 0.45 V vs Ag/AgCl at room temperature in argon-purged 0.1 M $HClO_4$ with 1 M methanol.

The inventors have characterized the electrocatalytic activities of the Pt containing $Ag_2S$-noble metal nanocomposites toward the room temperature methanol oxidation reaction (MOR) based on two welcome features of the hybrid materials. One is the relative smaller size of Pt domains on the $Ag_2S$-metal nanocomposites. The smaller size usually means that the particles have relative higher surface area, which is advantageous for the catalytic reaction. The electrochemical active surface area (ECSA) of Pt in Pt-containing $Ag_2S$-noble metal nanocomposites was determined using cyclic voltammetry and benchmarked against the commercial Pt/C catalysts (E-ETK, 20 wt % 3.2 nm Pt nanoparticles on Vulcan XC-72 carbon support, FIG. S7). FIG. 4a shows the cyclic voltammograms of Pt-containing nanocomposites and commercial Pt/C in argon-purged 0.1 M $HClO_4$ at room temperature. There are three distinct potential regions in the voltammograms: the hydrogen adsorption/desorption region (from −0.2 to 0.1 V vs Ag/AgCl), the double layer region (from 0.1 to 0.4 V), and the surface oxide ($OH_{ads}$) formation/stripping region (>0.4 V). The specific ESCA, based on the unit weight of Pt and calculated by integrating the charge associated with the hydrogen adsorption/desorption potential region after double-layer correction, is summarized in Table S2.

TABLE S2

A comparison of the specific electrochemical active surface area (ECSA) for Pt-containing $Ag_2S$-noble metal nanocomposites and commercial Pt/C. The data were calculated from FIG. 4a.

| Catalysts | ESCA ($m^2 \cdot g_{Pt}^{-1}$) |
| --- | --- |
| $Ag_2S$—Pt | 88.2 |
| $Ag_2S$—AuPt | 86.1 |
| $Ag_2S$—Pt/Os | 82.4 |
| $Ag_2S$—Au/Pt/Os | 81.3 |
| Pt/C | 72.9 |

As indicated, although the coherent interfaces between the Pt and $Ag_2S$ in the nanocomposites result in some blockage of the surface area of the Pt domains, the ECSA of the Pt in Pt-containing $Ag_2S$-metal nanocomposites is found to be higher than that of commercial Pt/C. The average ECSA for the Pt-containing $Ag_2S$-noble metal nanocomposites is 84.5 $m^2 \cdot g_{Pt}^{-1}$ and 16% higher than that of the commercial Pt/C (72.9 $m^2 \cdot g_{Pt}^{-1}$), which is not surprising considering that the size of Pt domains on $Ag_2S$ is only at about 1 nm.

The other welcome feature of the nanocomposites is the electronic coupling between the metal and semiconductor domains. The Pt 4f spectra of the commercial Pt/C and Pt-containing $Ag_2S$-noble metal nanocomposites were analyzed by X-ray photoelectron spectroscopy (XPS). FIG. 4b shows that the Pt 4f region of the spectrum can be deconvoluted into two pairs of doublets. As shown in Table S3, the more intense doublet (at 71.0 and 74.3 eV for Pt/C, 70.6 and 73.9 eV for $Ag_2S$—Pt, 70.3 and 73.6 eV for $Ag_2S$—Au/Pt, 70.5 and 73.8 eV for $Ag_2S$—Pt/Os, 70.3 and 73.6 eV for $Ag_2S$—Au/Pt/Os) is a signature of Pt in the zerovalent state.

TABLE S3

Binding energies and chemical states Pt in commercial Pt/C and Pt-containing $Ag_2S$-noble metal nanocomposites. The data were calculated from FIG. 4b.

| Materials | Pt $4F_{7/2}$ (eV) | Pt $4f_{5/2}$ (eV) | Assigned Chemical state |
| --- | --- | --- | --- |
| Pt/C | 71.0 | 74.3 | Pt(0) |
| | 72.4 | 75.2 | Pt(II) |
| $Ag_2S$—Pt | 70.6 | 73.9 | Pt(0) |
| | 71.8 | 74.6 | Pt(II) |
| $Ag_2S$—Au/Pt | 70.3 | 73.6 | Pt(0) |
| | 71.6 | 74.4 | Pt(II) |
| $Ag_2S$—Pt/Os | 70.5 | 73.8 | Pt(0) |
| | 71.9 | 74.7 | Pt(II) |
| $Ag_2S$—Au/Pt/Os | 70.3 | 73.6 | Pt(0) |
| | 71.6 | 74.4 | Pt(II) |

The second and weaker doublet, with binding energies 1.4 eV higher than those of Pt(0), could be assigned to the Pt(II) oxidation state as in PtO and $Pt(OH)_2$. Compared with the Pt $4f_{7/2}$ and $4f_{5/2}$ binding energies of commercial Pt/C catalysts, an appreciable shift to lower values was observed in the Pt-containing $Ag_2S$-noble metal nanocomposites, suggesting that electrons were transferred to Pt from other domains of the nanocomposites. The comparison of the Pt 4f XPS spectra of $Ag_2S$—Au/Pt and $Ag_2S$—Au/Pt/Os and other Pt-containing $Ag_2S$-metal nanocomposites ($Ag_2S$—Pt and $Ag_2S$—Pt/Os) further revealed that the presence of the Au domain could promote this electron donating effect. The shift of the Pt 4f binding energies to lower value is 0.7 eV in AgS—Au/Pt and AgS—Au/Pt/Os nanocomposites, while only about 0.4 to about 0.5 eV in $Ag_2S$—Pt and $Ag_2S$—Pt/Os nanocomposites. This electron donating effect to Pt domains could be explained by intra-particle charge transfer (see FIG. 4c for the energy level diagram). Comparison of the electronic affinity of bulk $Ag_2S$ (3.63 eV) and the work function of Pt (5.65 eV) predicts that the alignment of energy levels in $Ag_2S$ and Pt would be favorable for electron transfer from $Ag_2S$ to Pt. Analogues charge transfer has been observed in PbS—Au system, in which the electrons transfer from PbS shell to the inner-placed Au core results in the n-type to p-type change of hydrazine treated PbS. The electron transfer from $Ag_2S$ to Pt can also be described as the generation of a hole in the $Ag_2S$ domain. In the presence of Au domain (work function 5.1 eV), the alignment of energy levels in Au and $Ag_2S$ would be favourable for electron transfer from Au to $Ag_2S$ to fill the hole generated by the electron transfer to Pt domains, further promoting the electron transfer from $Ag_2S$ to Pt in order for the Fermi levels to match at the interface. The electron donating effect from Au to $Ag_2S$ has also been supported by the XPS analysis of Au 4f region, in which an appreciable shift of the 4f binding energies of Au in the nanocomposites to higher values was demonstrated by comparing with the Au 4f binding energies of monometallic Au particles (FIG. S8 and Table S4). On the other hand, the Os domains do not have contribution to the electron donation from $Ag_2S$ to Pt. The higher work function of Os (5.93 eV. CRC handbook on Chemistry and Physics version 2008) inhibits the electron donation from Os to the neighboring $Ag_2S$ domain.

TABLE S4

Binding energies and chemical states Au in pure Au and Au-containing, $Ag_2S$-noble metal nanocomposites. The data were calculated from FIG. 4c.

| Materials | Au $4f_{7/2}$ (eV) | Au $4f_{5/2}$ (eV) | Assigned Chemical state |
|---|---|---|---|
| Au | 84.2 | 87.9 | Au(0) |
| $Ag_2S$—Au/Pt | 84.9 | 88.6 | Au(0) |
| $Ag_2S$—Au/Pt/Os | 84.9 | 88.6 | Au(0) |

Pt is the most active metal for dissociative adsorption of methanol, but, as it is well-known, at room or moderate temperature it is readily poisoned by carbon monoxide (CO), an intermediate product of methanol oxidation. The nature of the Pt—CO bond in platinum systems has been well documented in literature (F. A. Cotton, G. Wilkinson. *Advanced Inorganic Chemistry* (Wiley-Interscience, New York, 1980)). The chemisorption of CO on Pt involves the donation of an electron pair from the σ* anti-bonding orbitals of CO to the unfilled 5d-orbitals of Pt. A back donation of electrons from the Pt metal to the CO-orbitals further stabilizes their interaction. Accordingly, it is thought that the dative electron donation from CO to Pt is a pre-requisite for strong CO-chemisorption. Analogous to the electron donation from Sn to Pt in the Pt—Sn system, the charge transfer from $Ag_2S$ to Pt in the Pt containing $Ag_2S$-noble metal nanocomposites, seen in XPS data, causes a substantial increase in the electron density around Pt-sites. This is likely to result in the weaker chemisorption of CO and might promote the methanol oxidation reaction (MOR). FIG. S9 shows the CO stripping voltammograms of commercial Pt/C and two kinds of Pt-containing $Ag_2S$-metal nanocomposites ($Ag_2S$—Pt and $Ag_2S$—Au/Pt) after the working electrode held at −0.15 V for 30 minutes in CO saturated 0.1 M $HClO_4$. The CO stripping peaks of the Pt-containing nanocomposites shifted negatively compared to commercial Pt/C, thereby indicating more facile CO removal and hence improved CO tolerance in practice. In addition, the CO stripping peaks of $Ag_2$—Au/Pt was situated at a potential more negative than that was required for CO stripping on $Ag_2S$—Pt nanocomposites, suggesting greater ease of CO removal from the Pt surfaces in $Ag_2S$—Au/Pt composites. The facile removal of CO on $Ag_2S$—Pt and $Ag_2S$—Au/Pt relative to commercial Pt/C reflects the effectiveness of electron coupling among the different domains in the nanocomposites.

Voltammograms of methanol oxidation shown in FIG. 4d were obtained in the potential window of 0-1 V at a swept rate of 20 mV $sec^{-1}$. The current densities in the voltammograms were normalized by the ECSA of Pt. The voltammetric features are typical of methanol electrooxidation reported in the literature (J. Yang, J. Y. Lee, H. P. Too, S. Valiyaveettil, *J. Phys. Chem. B* 110, 125 (2006)): Methanol oxidation on the Pt catalysts commenced at about 0.3 V and a fully developed oxidation peak was formed at about 0.7 V. The peak current densities associated with methanol oxidation in the forward and reverse scan are summarized in Table S5.

TABLE S5

Electrochemical measurements of methanol oxidation on commercial Pt/C and different Pt-containing $Ag_2S$-noble metal nanocomposites.

| Materials | Forward scan peak potential (V) | Forward scan peak current density (mA · $cm^{-2}$) | Backward scan peak potential (V) | Backward scan peak current density (mA · $cm^{-2}$) |
|---|---|---|---|---|
| Pt/C | 0.70 | 30.5 | 0.50 | 26.2 |
| $Ag_2S$—Pt | 0.68 | 47.1 | 0.48 | 45.2 |
| $Ag_2S$—Au/Pt | 0.70 | 71.5 | 0.50 | 68.8 |
| $Ag_2S$—Pt/Os | 0.68 | 41.7 | 0.50 | 46.4 |
| $Ag_2S$—Au/Pt/Os | 0.67 | 67.4 | 0.49 | 62.4 |

As expected, from the comparison of current densities, the Pt-containing nanocomposites showed higher specific activities than that of the commercial Pt/C nanoparticles and of which the $Ag_2S$—Au/Pt and $Ag_2S$—Au/Pt/Os nanocomposites displayed highest catalytic activity for the methanol oxidation. One can conclude that the observed enhanced catalytic activity of $Ag_2S$-metal nanocomposites results from the reasonably high surface area intrinsic to the smaller Pt domains and the electronic coupling between the Pt and other domains in the nanocomposites. The long-term performance of commercial Pt/C and Pt-containing $Ag_2S$-metal nanocomposites in methanol oxidation was demonstrated by chronoamperograms in FIG. 4e. The slower rate of decay for the Pt-containing nanocomposites indicates that they have better CO tolerance than that of the commercial Pt/C catalysts.

Contrary to their high catalytic activity for MOR, the Pt-containing $Ag_2S$-noble metal nanocomposites exhibited poor activity for oxygen reduction reaction (ORR), another key reaction in DMFC. Polarization curves for the ORR on commercial Pt/C catalysts, $Ag_2S$—Pt, and $Ag_2S$—Au/Pt nanocomposites are shown in FIG. S10. Table S6 provides a summary of the catalytic activity data of these catalysts for ORR at room temperature.

TABLE S6

Comparison of the catalytic activity of Pt/C, $Ag_2S$—Pt, and $Ag_2$—Au/Pt for the reduction of $O_2$ at room temperature. The data were obtained from FIG. S10.

| Materials | Half-wave potential at 1600 rpm (V) | Kinetic current density at half-wave potential (mA · $cm^{-2}$) |
|---|---|---|
| Pt/C | 0.61 | 2.50 |
| $Ag_2S$—Pt | 0.46 | 1.90 |
| $Ag_2S$—Au/Pt | 0.36 | 1.71 |

The half-wave potentials for $Ag_2S$—Pt and $Ag_2S$—Au/Pt are 460 mV and 360 mV, only 75% and 59% of commercial Pt/C, respectively. The kinetic current density at half-wave potential of nanocomposites is also lower than that of Pt/C catalysts. The poor catalytic activity of the nanocomposites for ORR is not surprised if one considers an article contributed by Watanabe and co-workers (T. Toda, H. Igarashi, H. Uchida, M. Watanabe, *J. Electrochem. Soc.* 146, 3750 (1999)). In their work, Fe, Ni, or Co was alloyed with Pt to enhance the electro-catalytic activity for oxygen reduction. Fe, Ni, or Co has more 5d vacancies than Pt and can withdraw electrons from the latter. This withdrawing effect induces an increase of 5d vacancies in Pt, which leads to an increased 2π electron donation from $O_2$ to the surface Pt, and results in an increased $O_2$ adsorption favourable for the reduction of oxygen. However, for the Pt-containing $Ag_2S$-noble metal nanocomposites, the electron donation effect from the semiconductor to the Pt domains makes Pt has less 5d vacancies. In this case, the adsorption of $O_2$ on the nanocomposites is too weak to conduct the dissociation of $O_2$. Such behaviour could account for the poor activity of the Pt-containing nanocomposites toward ORR.

The present studies provide a superior route for synthesizing semiconductor-noble metal nanocomposites with improved MOR activity through the electron coupling among the different domains of the hybrid materials. Through the optimization of both composition and dimension of the nanocomposites by varying the ratio of metal precursor to semiconductor seeds involved in a synthesis, further enhancement toward MOR could be expected. Additionally, an improved ORR semiconductor-Pt system can be designed, in which the energy level alignment favourable for the electron donation from Pt domain to the semiconductor section. The metal-nanocomposite materials of the instant invention can be applied as selective catalysts for fuel cell reactions in micro-fuel cell. The semiconductor-metal nanocomposites can also be used as catalysts beyond fuel cell applications, for example, photocatalysis and organic synthesis.

EXAMPLES

The following examples are offered to illustrate, but not to limit the claimed invention.

Example 1

General Materials

The chemical reagents, including $AgNO_3$ (99%), $Na_2PdCl_4$ (98%), $OsCl_3$ (99.9%), $K_2PtCl_4$ (98%), $HAuCl_4.3H_2O$ (99.9%), $Na_2S.9H_2O$ (≥98%), sodium citrate dehydrate (≥99%), dodecylamine (DDA, 98%), and Nafion 117 solution (5% in a mixture of lower aliphatic alcohols and water) from Sigma-Aldrich, ethanol (ACS reagent, 99.5%), methanol (ReagentPlus, 99%), and toluene (ACS reagent, 99.5%) from Merck, bis(p-sulfonatophenyl)phenylphosphane dihydrate dipotassium salt (BSPP, 97%) from Strem Chemicals, aqueous $HClO_4$ solution (70%, ACS reagent), commercial Pt/C catalysts (20 wt % 3.2 nm Pt nanoparticles on Vulcan XC-72 carbon support) from E-TEK, and Vulcan XC-72 carbon powders (BET surface area of 250 $m^2$ $g^{-1}$ and average particle size of 40~50 nm) from Cabot, were used as received. All glassware and Teflon-coated magnetic stirring bars were cleaned with aqua regia, followed by copious rinsing with de-ionized water before drying in an oven.

Example 2

Synthesis of Monoclinic $Ag_2S$ Nanocrystals

In a typical synthesis of the hydrosol of monoclinic $Ag_2S$ nanocrystals, 600 mg of BSPP was added to 300-mL of 1 mM aqueous $AgNO_3$ solution hosted in a 1000-mL beaker. The mixture was stirred for 1 hour, followed by prompt addition of 10-mL of 50 mM aqueous $Na_2S$ solution. A brown-colored hydrosol was obtained after 4 hours stirring of the reaction mixture at room temperature, indicating the formation of $Ag_2S$ nanocrystals.

Example 3

Synthesis of $Ag_2S$—Au Nanocomposites 30-mL of the $Ag_2S$ hydrosol prepared above was refluxed at 105° C. for 3 minutes in a 100-mL of three-necked flask equipped with a condenser and a Teflon-coated magnetic stirring bar, followed by the addition of 1.5-mL of 100 mM aqueous sodium citrate solution. The mixture was refluxed one more minute at 105° C. and then 0.6-mL of 50 mM aqueous $HAuCl_4$ solution was added swiftly. The reaction mixture was continuously refluxed for 30 minutes at 105° C. to form the hydrosol of $Ag_2S$—Au nanocomposites. The $Au/Ag_2S$ precursor molar ratio was controlled by mixing different volumes of aqueous $HAuCl_4$ solution and $Ag_2S$ hydrosol.

For the latter comparison, pure Au hydrosol was also prepared. A stirred aqueous solution of $HAuCl_4$ (1 mM, 20 mL) was refluxed in for 30 minutes at 110° C. 2 mL of 40 mM of aqueous tri-sodium citrate solution were added quickly, which resulted in a series of color changes before turning red. The mixture was refluxed for another 15 min, and allowed to cool to room temperature. The Au particles in the hydrosol were collected by centrifugation, washed and dried in vacuum at room temperature.

Example 4

Synthesis of $Ag_2S$—Pt Nanocomposites 60-mL of the $Ag_2S$ hydrosol prepared above was refluxed at 110° C. for 3 minutes in a 100-mL of three-necked flask equipped with a condenser and a Teflon-coated magnetic stirring bar, followed by the addition of 3-mL of 100 mM aqueous sodium citrate solution. The mixture was refluxed one more minute at 110° C. and then 1.2-mL of 50 mM aqueous $K_2PtCl_4$ solution was added swiftly. The reaction mixture was continuously refluxed for 120 minutes at 110° C. to form the hydrosol of $Ag_2S$—Pt nanocomposites. The $Pt/Ag_2S$ precursor molar ratio was controlled by mixing different volumes of aqueous $K_2PtCl_4$ solution and $Ag_2S$ hydrosol.

Example 5

Synthesis of $Ag_2S$—Pd Nanocomposites 30-mL of the $Ag_2S$ hydrosol prepared above was refluxed at 110° C. for 3 minutes in a 100-mL of three-necked flask equipped with a condenser and a Teflon-coated magnetic stirring bar, followed by the addition of 3-mL of 100 mM aqueous sodium citrate solution. The mixture was refluxed one more minute at 110° C. and then 1.2-mL of 50 mM aqueous $Na_2PdCl_4$ solution was added swiftly. The reaction mixture was continuously refluxed for 120 minutes at 110° C. to form the hydrosol of $Ag_2S$—Pd nanocomposites.

Example 6

Synthesis of $Ag_2S$—Rh Nanocomposites 30-mL of the $Ag_2S$ hydrosol prepared above was refluxed at 110° C. for 3 minutes in a 100-mL of three-necked flask equipped with a condenser and a Teflon-coated magnetic stirring bar, followed by the addition of 3-mL of 100 mM aqueous sodium citrate solution. The mixture was refluxed one more minute at 110° C. and then 1.2-mL of 50 mM is aqueous $RhCl_3$ solution was added swiftly. The reaction mixture was continuously refluxed for 8 hours at 110° C. to form the hydrosol of $Ag_2S$—Rh nanocomposites.

Example 7

Synthesis of $Ag_2S$—Os Nanocomposites 30-mL of the $Ag_2S$ hydrosol prepared above was refluxed at 110° C. for 3 minutes in a 100-mL of three-necked flask equipped with a condenser and a Teflon-coated magnetic stirring bar, followed by the addition of 3-mL of 100 mM aqueous sodium citrate solution. The mixture was refluxed one more minute at 110° C. and then 0.6-mL of 50 mM aqueous $OsCl_3$ solution was added swiftly. The reaction mixture was continuously refluxed for 15 hours at 110° C. to form the hydrosol of $Ag_2S$—Os nanocomposites.

Example 8

Synthesis of $Ag_2S$—Ir Nanocomposites 30-mL of the $Ag_2S$ hydrosol prepared above was refluxed at 110° C. for 3 minutes in a 100-mL of three-necked flask equipped with a condenser and a Teflon-coated magnetic stirring bar, followed by the addition of 3-mL of 100 mM aqueous sodium citrate solution. The mixture was refluxed one more minute at 110° C. and then 0.6-mL of 50 mM aqueous $IrCl_4$ solution was added swiftly. The reaction mixture was continuously refluxed for 10 hours at 110° C. to form the hydrosol of $Ag_2S$—Ir nanocomposites.

Example 9

Synthesis of $Ag_2S$—AuPt Nanocomposites 60-mL of the $Ag_2S$ hydrosol prepared above was refluxed at 105° C. for 3 minutes in a 100-mL of three-necked flask equipped with a condenser and a Teflon-coated magnetic stirring bar, followed by the addition of 6-mL of 100 mM aqueous sodium citrate solution. The mixture was refluxed one more minute at 105° C. and then 1.2-mL of 50 mM aqueous $HAuCl_4$ solution was added swiftly. The reaction mixture was continuously refluxed for 30 minutes at 105° C. to form the $Ag_2S$—Au hydrosol. Next, the temperature of the reaction system was increased to 110° C., followed by the addition of 1.2-mL of 50 mM aqueous $K_2PtCl_4$ solution. The reaction mixture was then continuously refluxed for 2 hours at 110° C. to form the hydrosol of $Ag_2S$—AuPt nanocomposites.

Example 10

Synthesis of $Ag_2S$—AuOs Nanocomposites 30-mL of the $Ag_2S$ hydrosol prepared above was refluxed at 105° C. for 3 minutes in a 100-mL of three-necked flask equipped with a condenser and a Teflon-coated magnetic stirring bar, followed by the addition of 3-mL of 100 mM aqueous sodium citrate solution. The mixture was refluxed one more minute at 105° C. and then 0.6-mL of 50 mM aqueous $HAuCl_4$ solution was added swiftly. The reaction mixture was continuously refluxed for 30 minutes at 105° C. to form the $Ag_2S$—Au hydrosol. Next, the temperature of the reaction system was increased to 110° C., followed by the addition of 0.6-mL of 50 mM aqueous $OsCl_3$ solution. The reaction mixture was then continuously refluxed for 15 hours at 110° C. to form the hydrosol of $Ag_2S$—AuOs nanocomposites.

Example 11

Synthesis of $Ag_2S$—PtOs Nanocomposites 60-mL of the $Ag_2S$ hydrosol prepared above was refluxed at 110° C. for 3 minutes in a 100-mL of three-necked flask equipped with a condenser and a Teflon-coated magnetic stirring bar, followed by the addition of 6-mL of 100 mM aqueous sodium citrate solution. The mixture was refluxed one more minute at 110° C. and then 1.2-mL of 50 mM aqueous $K_2PtCl_4$ solution. The reaction mixture was continuously refluxed for 2 hours at 110° C. to form the $Ag_2S$—Pt hydrosol. Next, 1.2-mL of 50 mM aqueous $OsCl_3$ solution was added. The reaction mixture was continuously refluxed for 15 hours at 110° C. to form the hydrosol of $Ag_2S$—PtOs nanocomposites.

Example 12

Synthesis of $Ag_2S$—AuPtOs Nanocomposites 60-mL of the $Ag_2S$ hydrosol prepared above was refluxed at 105° C. for 3 minutes in a 100-mL of three-necked flask equipped with a condenser and a Teflon-coated magnetic stirring bar, followed by the addition of 9-mL of 100 mM aqueous sodium citrate solution. The mixture was refluxed one more minute at 105° C. and then 1.2-mL of 50 mM aqueous $HAuCl_4$ solution was added swiftly. The reaction mixture was continuously refluxed for 30 minutes at 105° C. to form the $Ag_2S$—Au hydrosol. Next, the temperature of the reaction system was increased to 110° C., followed by the addition of 1.2-mL of 50 mM aqueous solution of $K_2PtCl_4$. The reaction mixture was continuously refluxed for 2 hours at 110° C. and then 1.2-mL of 50 mM aqueous solution of $OsCl_3$ was added. The reaction mixture was then continuously refluxed for 15 hours at 110° C. to form the hydrosol of $Ag_2S$—AuPtOs nanocomposites.

Example 13

Phase Transfer of $Ag_2S$ Nanocrystals and $Ag_2S$-metal Nanocomposites

The phase transfer of $Ag_2S$ nanocrystals and $Ag_2S$-metal nanocomposites from aqueous phase to a non-polar organic medium was conducted since the inventors experimentally found that the loading efficiency of the particles on XC-72C carbon powders from organic medium (about 99%) much higher than that from aqueous phase (about 37%). Typically, the $Ag_2S$ or $Ag_2S$-metal hydrosol was mixed with equal volume of ethanolic solution of DDA (90 mM). After 3 min of stirring, equal volume of toluene were added and stirred for another minute. Phase transfer of the $Ag_2S$-metal nanocomposites from water to toluene would then occur quickly and completely, leaving a clear colorless solution in the aqueous phase. ICP-AES analysis showed that the phase transfer efficiency was about 100%.

Example 14

Characterizations of $Ag_2S$ and $Ag_2S$-metal Nanocomposites

Transmission electron microscopy (TEM) was performed on a FEI Tecnai $G^2$ F20 electron microscope operated at 200 kV with the software package for automated electron tomography. For TEM measurements, a drop of the nanoparticle solution was dispensed onto a 3-mm carbon-coated copper grid. Excess solution was removed by an absorbent paper, and the sample was dried under vacuum at room temperature. The average particle size and particle size distribution were obtained from a few randomly chosen areas in the TEM image containing about 200 nanoparticles each.

An energy-dispersive X-ray spectroscopy (EDX) analyzer attached to the FEI Tecnai $G^2$ F20 TEM operating in the scanning transmission electron microscopy (STEM) mode was used to analyze the components in the $Ag_2S$-meta; nanocomposites. The electron beam was only 0.7 nm in diameter, capable of providing a high-resolution analysis.

Powder x-ray diffraction (XRD) patterns were recorded on a Rigaku D/Max-3B diffractometer, using Cu $K_\alpha$ radiation ($\lambda$=1.54056 Å). X-ray photoelectron spectra (XPS) analyses were conducted on an ESCALAB MKII spectrometer (VG Scientific) using Al—$K_\alpha$ radiation (1486.71 eV). Samples for XRD and XPS were concentrated from the toluene solution of $Ag_2S$-metal nanocomposites to 0.5-mL using flowing Ar. 10-mL of methanol were then added to precipitate the metal nanoparticles. The nanocomposites were recovered by centrifugation, and washed with methanol several times. They were then dried at room temperature in vacuum.

Example 15

Electrochemical Measurements

Electrochemical measurements were carried out in a standard three-electrode cell, which was connected to a PGSTAT 30 potentiostat. A leak-free Ag/AgCl (saturated with KCl) electrode was used as the reference. The counter electrode was a platinum mesh (1×1 cm$^2$) attached to a platinum wire.

Loading of $Ag_2S$-metal Nanocomposites on Carbon Support

For the loading of the catalysts on Vulcan XC-72 carbon support, 47 mg of carbon powders was introduced into the Pt containing organosol of $Ag_2S$-metal nanocomposites ($Ag_2S$—Pt, $Ag_2S$—AuPt, $Ag_2S$—PtOs, or $Ag_2S$—AuPtOs). After 24 hours stirring of the mixtures, the nanocomposites/C ($Ag_2S$—Pt/C, $Ag_2S$—AuPt/C, $Ag_2S$—PtOs/C, or $Ag_2S$—AuPtOs/C, 20 wt % Pt containing nanocomposites on carbon support) were collected using centrifugation and washed 3 times with methanol. They were then dried at room temperature in vacuum.

Preparation of Working Electrode

A thin layer of Nafion-impregnated catalyst cast on a vitreous carbon disk was used as the working electrode. The preparation of the catalyst ink followed a typical procedure in the literature with modification (H. A. Gasteiger et al., *Appl. Catal. B* 56, 9 (2005)). 10 mg of commercial Pt/C or nanocomposite/C was ultrasonically dispersed in 10 ml of aqueous solution containing 4-mL of ethanol and 0.1-mL of the Nafion solution. A calculated volume of the ink was dispensed onto the 5 mm glassy carbon disk electrode to produce a nominal catalyst loading of 20 μg·cm$^{-2}$ (Pt base). The carbon electrode was then dried in a stream of warm air at 70° C. for 1 hour.

Electrochemically Active Surface Area (ECSA)

Cyclic sweep voltammograms scanned at 50 mV·s$^{-1}$ were recorded between -0.2 V and 1 V at room temperature in argon-purged 0.1 M $HClO_4$ for the measurements of electrochemically active surface area (ECSA) of the catalysts. The ECSA was estimated by measuring the charge ($Q_H$) associated with the hydrogen adsorption potential region (denoted as the underpotentially deposited hydrogen, $H_{upd}$) between -0.2 V and 0.1 V and assuming 210 μC·cm$^{-2}$ for the adsorption of a monolayer of hydrogen on a Pt surface ($q_H$). The $H_{upd}$ adsorption charge ($Q_H$) can be determined using $Q_H$=0.5×Q, where Q is the charge in the $H_{upd}$ adsorption/desorption are obtained after double-layer correction. Then, the specific ECSA was calculated based on the following relation:

$$ECSA = \frac{Q_H}{m \times q_H}$$

where $Q_H$ is the charge for $H_{upd}$ adsorption, m is the loading amount of metal, and $q_H$ is the charge required for monolayer adsorption of hydrogen on a Pt surface.

Methanol Oxidation Reaction (MOR)

The catalyst performance in room temperature methanol oxidation reaction (MOR) was evaluated by cyclic voltammetry. The potential window from 0 V to 1 V was scanned at 20 mV·s$^{-1}$ until a stable response was obtained before the voltammograms were recorded. The electrolyte was 1 M methanol in 0.1 M perchloric acid. For each catalyst (commercial Pt/C, $Ag_2S$—Pt/C, $Ag_2S$—AuPt/C, $Ag_2S$—PtOs/C, or $Ag_2S$—AuPtOs/C), the current density was normalized to the ECSA in order to obtain specific activities, respectively.

CO Stripping Test

For the anodic stripping of CO, 10% CO in air was used to saturate the 0.1 M $HClO_4$ electrolyte for 30 minutes while the working electrode was held at -0.15 V. The passage of CO was then stopped and the electrolyte was thoroughly purged with high purity Ar. CO stripping voltammetry was then commenced in the potential window of -0.2 V to 1 V starting from -0.15 V.

Oxygen Reduction Reaction (ORR)

The catalyst performance in room temperature oxygen reduction reaction (ORR) was evaluated in 0.1 M $HClO_4$ electrolyte solution using a glass carbon rotating disk electrode (RDE) at a rotation rate of 1600 rpm. Negative-going linear sweep voltammograms were recorded from 0.8 to 0 V at 20 mV·s$^{-1}$ at room temperature in the presence of bubbling ultra-pure oxygen to maintain a saturated oxygen atmosphere near the working electrode. For each catalyst (commercial Pt/C, $Ag_2S$—Pt/C, and $Ag_2S$—AuPt/C), the current density was normalized to the ECSA in order to obtain specific activities, respectively.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A nanocomposite particle comprising:
   a nanoparticle having a surface comprising a silver salt, and
   at least one region of a first noble metal on said surface;
   said nanocomposite particle additionally comprising at least one region of a second noble metal on said surface, said second noble metal being different to the first noble metal.

2. The nanocomposite particle of claim 1 wherein the first noble metal and the second noble metal, are each independently selected from the group consisting of gold, platinum, palladium, rhodium, osmium, silver, ruthenium and iridium.

3. A nanocomposite material comprising a plurality of nanocomposite particles comprising:
   a nanoparticle having a surface comprising a silver salt, and
   at least one region of a first noble metal on said surface, wherein if said first noble metal is gold, there is additionally at least one region of a second noble metal on said surface, said second noble metal being different to the first noble metal;

wherein the nanocomposite particles of the nanocomposite material have a mean diameter of about 3 to about 15 nm.

4. A process for making a nanocomposite material comprising a plurality of nanocomposite particles comprising:
a nanoparticle having a surface comprising a silver salt, and at least one region of a first noble metal on said surface,
wherein if said first noble metal is gold, there is additionally at least one region of a second noble metal on said surface, said second noble metal being different to the first noble metal, said process comprising:
combining a heated aqueous mixture comprising nanoparticles and a reducing agent with a compound or complex of the first noble metal, said nanoparticles each having a surface comprising a silver salt; and
maintaining the resulting reaction mixture at an elevated temperature for sufficient time to form at least one region of the first noble metal on the surface of said nanoparticles; thereby producing an aqueous dispersion of the nanocomposite material.

5. The process of claim 4 wherein the reducing agent comprises citric acid and/or citrate.

6. The process of claim 4 additionally comprising combining the dispersion with further reducing agent and a compound or complex of the second noble metal, and maintaining the resulting mixture at an elevated temperature for sufficient time to form at least one region of the second noble metal on the surface of said nanoparticles, said second noble metal being different to the first noble metal;
thereby forming an aqueous dispersion of the nanocomposite material in which the nanoparticles comprise at least one region of the first noble metal and at least one region of the second noble metal on the surface thereof.

7. The process of claim 4 comprising preparing the nanoparticles by a combining an aqueous solution of a water soluble silver salt and a stabilising agent with an aqueous solution of a water soluble salt comprising a counterion capable of forming an insoluble salt with silver ions, so as to form the nanoparticles in the form of an aqueous dispersion of the silver salt of the counterion.

8. The process of claim 7 wherein the stabilising agent is bis(p-sulfonatophenyl)phenylphosphane dihydrate dipotassium salt.

9. The process of claim 4 additionally comprising:
adding to the aqueous dispersion of the nanocomposite material a solution of an amine in a water soluble organic solvent, and
agitating the resulting mixture with a second solvent which forms a two phase system with said mixture, so as to transfer the nanocomposite material to the second solvent and form a dispersion of the nanocomposite material in the second solvent.

10. The process of claim 4 wherein the silver salt is silver sulfide.

11. A process for making a nanocomposite material comprising a plurality of nanocomposite particles comprising:
a nanoparticle having a surface comprising a silver salt, and at least one region of a first noble metal on said surface,
wherein if said first noble metal is gold, there is additionally at least one region of a second noble metal on said surface, said second noble metal being different to the first noble metal, said process comprising:
combining a heated aqueous mixture comprising nanoparticles and a reducing agent with at least two compounds or complexes of different noble metals or with a mixed metal compound or complex comprising at least two different noble metals in the same compound or complex, said nanoparticles each having a surface comprising a silver salt; and
maintaining the resulting reaction mixture at an elevated temperature for sufficient time to form either at least one region of each noble metal or else at least one region of a mixture of the noble metals on the surface of said nanoparticles;
thereby forming an aqueous dispersion of the nanocomposite material.

12. A method for adsorbing a nanocomposite material comprising a plurality of nanocomposite particles comprising:
a nanoparticle having a surface comprising a silver salt, and at least one region of a first noble metal on said surface,
wherein if said first noble metal is gold, there is additionally at least one region of a second noble metal on said surface, said second noble metal being different to the first noble metal, onto a particulate carbon, said method comprising combining a dispersion of said nanocomposite material in a solvent with the particulate carbon and agitating the resulting mixture for sufficient time to adsorb the nanocomposite material onto the surface of the particulate carbon.

13. The method of claim 12 wherein the solvent is an aromatic hydrocarbon solvent.

14. An electrode comprising:
a glassy carbon electrode; and
a coating composition comprising a nanocomposite material adsorbed onto a particulate carbon, said coating composition being disposed on the surface of the glassy carbon electrode, said nanocomposite material comprising a plurality of nanocomposite particles comprising:
a nanoparticle having a surface comprising a silver salt, and at least one region of a first noble metal on said surface,
wherein if said first noble metal is gold, there is additionally at least one region of a second noble metal on said surface, said second noble metal being different to the first noble metal.

15. The electrode of claim 14 wherein at least one noble metal on the surface of nanocomposite particles of the nanocomposite material is platinum.

16. A method, comprising:
applying an electrode in a methanol reduction, said electrode comprising:
a glassy carbon electrode; and
a coating composition comprising a nanocomposite material adsorbed onto a particulate carbon, said coating composition being disposed on the surface of the glassy carbon electrode, said nanocomposite material comprising a plurality of nanocomposite particles comprising:
a nanoparticle having a surface comprising a silver salt, and at least one region of a first noble metal on said surface,
wherein if said first noble metal is gold, there is additionally at least one region of a second noble metal on said surface, said second noble metal being different to the first noble metal.

17. An electrode comprising:
a glassy carbon electrode; and
a coating composition comprising a nanocomposite material adsorbed onto a particulate carbon, said coating composition being disposed on the surface of the glassy carbon electrode, said nanocomposite material comprising a plurality of nanocomposite particles comprising:
a nanoparticle having a surface comprising a silver salt, and at least one region of a first noble metal on said surface, wherein if said first noble metal is gold, there is additionally at least one region of a second noble metal on said surface, said second noble metal being different to the first noble metal, wherein at least one noble metal on the surface of nanocomposite particles of the nanocomposite material is platinum.

* * * * *